(12) United States Patent
Hazama et al.

(10) Patent No.: US 12,240,447 B2
(45) Date of Patent: Mar. 4, 2025

(54) OBJECT DETECTION DEVICE AND DRIVING ASSISTANCE SYSTEM

(71) Applicant: Panasonic Intellectual Property Management Co., Ltd., Osaka (JP)

(72) Inventors: Sumiaki Hazama, Kanagawa (JP); Yoshimasa Okabe, Kanagawa (JP); Hiroki Yamashita, Kanagawa (JP); Shingo Kawahara, Kanagawa (JP); Chiaki Izumoto, Kanagawa (JP); Yusuke Nakamura, Kanagawa (JP); Teppei Shibata, Kanagawa (JP); Toru Chikamitsu, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 231 days.

(21) Appl. No.: 17/944,923

(22) Filed: Sep. 14, 2022

(65) Prior Publication Data

US 2023/0001919 A1 Jan. 5, 2023

Related U.S. Application Data

(63) Continuation of application No. PCT/JP2021/003741, filed on Feb. 2, 2021.

(30) Foreign Application Priority Data

Mar. 31, 2020 (JP) ................................ 2020-062930
Mar. 31, 2020 (JP) ................................ 2020-063983

(Continued)

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC .. B60W 30/09; B60W 10/18; B60W 30/0956; B60W 40/04; B60W 2420/54;
(Continued)

(56) References Cited

U.S. PATENT DOCUMENTS 9,575,179 B2    2/2017  Fukuman et al.
2015/0307091 A1* 10/2015 Gokan .................... G01S 7/539
                                                              701/70
(Continued)

FOREIGN PATENT DOCUMENTS

JP    2000222700 A    8/2000
JP    2016081449 A    5/2016

OTHER PUBLICATIONS

International Search Report, mailed Mar. 16, 2021, for International Patent Application No. PCT/JP2021/003741. (3 pages).

*Primary Examiner* — Abby Y Lin
*Assistant Examiner* — Esvinder Singh
(74) *Attorney, Agent, or Firm* — Seed IP Law Group LLP

(57) ABSTRACT

An object detection device includes first and second detectors each configured to detect an object by transmitting an ultrasonic wave in a moving direction of the moving object and receiving a reflected wave of the ultrasonic wave, a second detector, a memory, and a hardware processor coupled to the memory, and configured to: determine that an obstacle is present in the moving direction of the moving object, based on object detection results by the first and second detectors; determine crossing of the obstacle based on object detection results by the first and second detectors in a state in which it is being determined that the obstacle is (Continued)

present; and cause a driving controller mounted on the moving object, to release driving restriction control of restricting movement of the moving object when determining the crossing, or prohibit the driving controller from releasing the driving restriction control under a predetermined condition.

14 Claims, 20 Drawing Sheets

(30) Foreign Application Priority Data

| Mar. 31, 2020 | (JP) | ................................. 2020-063984 |
| Mar. 31, 2020 | (JP) | ................................. 2020-063985 |
| Nov. 5, 2020 | (JP) | ................................. 2020-184779 |

(51) Int. Cl.
*B60W 30/095* (2012.01)
*B60W 40/04* (2006.01)
*G01S 15/08* (2006.01)
*G01S 15/46* (2006.01)
*G01S 15/62* (2006.01)
*G01S 15/931* (2020.01)

(52) U.S. Cl.
CPC ............ *B60W 40/04* (2013.01); *G01S 15/08* (2013.01); *G01S 15/46* (2013.01); *G01S 15/62* (2013.01); *G01S 15/931* (2013.01); *B60W 2420/54* (2013.01); *B60W 2554/4041* (2020.02); *B60W 2554/4045* (2020.02); *B60W 2554/80* (2020.02)

(58) Field of Classification Search
CPC . B60W 2554/4041; B60W 2554/4045; B60W 2554/80; B60W 30/095; B60W 30/08; B60W 30/146; B60W 50/12; B60W 2422/90; B60W 2422/95; B60W 2720/106; B60W 60/0015; B60W 60/0016; B60W 60/0017; B60W 60/0018; B60W 60/007; B60W 60/0051; G01S 15/08; G01S 15/46; G01S 15/62; G01S 15/931; G01S 15/66; G01S 15/58; G01S 15/878; G01S 15/04; G01S 15/06; G01S 15/50; G01S 15/52; G01S 15/93; G01S 15/874; G01S 15/876; G01S 2015/465; G01S 2015/938; G08G 1/16
See application file for complete search history.

(56) References Cited

U.S. PATENT DOCUMENTS

| 2016/0116584 A1* | 4/2016 | Fukuman ................ G01S 15/46 367/93 |
| 2016/0116591 A1* | 4/2016 | Fukuman ................ G01S 15/46 367/124 |
| 2017/0008517 A1* | 1/2017 | Himi ........................ G01S 15/87 |
| 2018/0357772 A1* | 12/2018 | Takemura .............. G06V 20/58 |
| 2019/0225266 A1* | 7/2019 | Enomoto .............. G01S 13/867 |
| 2020/0262422 A1* | 8/2020 | Kamiya .......... B60W 30/18159 |
| 2020/0391728 A1* | 12/2020 | Okumura .............. B60W 30/08 |

* cited by examiner

OBJECT DETECTION DEVICE AND DRIVING ASSISTANCE SYSTEM

CROSS-REFERENCE TO RELATED APPLICATIONS

This application is a continuation of International Application No. PCT/JP2021/003741, filed on Feb. 2, 2021 which claims the benefit of priority of the prior Japanese Patent Application No. 2020-062930, filed on Mar. 31, 2022 Japanese Patent Application No. 2020-063983, filed on Mar. 31, 2020, Japanese Patent Application No. 2020-063984, filed on Mar. 31, 2020, Japanese Patent Application No. 2020-063985, filed on May 11, 2020, and Japanese Patent Application No. 2020-184779, filed on May 11, 2020, the entire contents of which are incorporated herein by reference.

FIELD

The present disclosure relates to an object detection device for detecting an object in the surroundings and a driving assistance system.

BACKGROUND

Conventionally, it has been proposed to equip a vehicle with a distance measuring sensor such as an ultrasonic sensor to detect objects such as vehicles ahead or pedestrian obstacles around the vehicle, and to perform various controls for improving the driving safety of the vehicle, such as activating a control device and giving notification to the driver, based on the object detection results.

An object detection device disclosed in Patent Document 1 detects objects around a vehicle. In the object detection device disclosed in Japanese Patent Application Laid-open No. 2016-81449, when a state in which an object is detected in the first detector and the second detector changes to a state in which the object is undetected in the first detector, it is determined that crossing of an obstacle has occurred, and driving restriction control of restricting movement of the moving object is released.

The present disclosure provides an object detection device that can provide driving assistance as intended by the driver depending on the situation.

SUMMARY

An object detection device according to an aspect of the present invention is mounted on a moving object to detect an object present around the moving object. The object detection device includes a first detector, a second detector, a memory, and a hardware processor coupled to the memory. The first detector is configured to detect an object by transmitting an ultrasonic wave in a moving direction of the moving object and receiving a reflected wave of the ultrasonic wave. The second detector is configured to detect an object by transmitting an ultrasonic wave in the moving direction of the moving object from a position different from the first detector and receiving a reflected wave of the ultrasonic wave. The hardware processor is configured to: determine that an obstacle is present in the moving direction of the moving object, based on an object detection result by the first detector and an object detection result by the second detector; determine crossing of the obstacle based on an object detection result by the first detector and an object detection result by the second detector in a state in which the hardware processor is determining that the obstacle is present; and cause a driving controller mounted on the moving object, to release driving restriction control of restricting movement of the moving object when the hardware processor determines the crossing, or prohibit the driving controller from releasing the driving restriction control under a predetermined condition.

DETAILED DESCRIPTION

Figure 1:
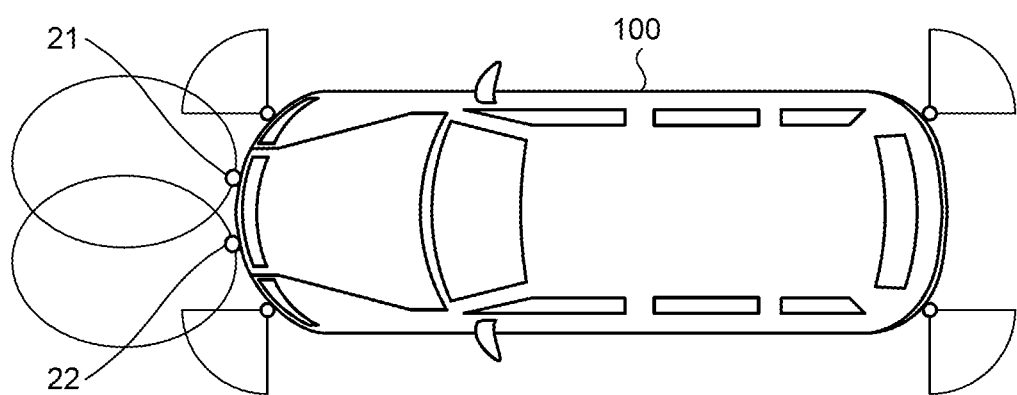
FIG. 1 is a diagram illustrating an exemplary configuration of an object detection device.

Embodiments of the present disclosure will be described in detail below with reference to the drawings.

First Embodiment

A first embodiment embodied as an object detection device 1 mounted on a moving object will be described below with reference to the drawings. The object detection device 1 according to the present embodiment is a vehicle-mounted device mounted on a vehicle 100 as a moving object and receives object detection information from an obstacle sensor 2 to detect, for example, an obstacle 3 or a second vehicle, as an object present around the vehicle 100. The object detection device 1 forms a part of a driving assistance system with a vehicle control device 5.

First, a configuration of the object detection device 1 according to the present embodiment will be described using FIG. 1.

The obstacle sensor 2 is, for example, an ultrasonic sensor and has a function of transmitting an ultrasonic wave of 20 to 100 kHz as a transmitted wave and a function of receiving an ultrasonic wave reflected from an object as a reflected wave. In the present embodiment, a first detector 21 and a second detector 22 are attached at the front of the vehicle at a distance from each other such that they are aligned in a vehicle width direction that is a direction orthogonal to the moving direction of the vehicle 100.

Specifically, the first detector 21 is provided on the right side of the centerline of the vehicle 100. The second detector 22 is provided on the left side of the centerline of the vehicle 100. The first detector 21 and the second detector 22 may be mounted, for example, at the back of the vehicle, rather than the front of the vehicle.

The first detector 21 and the second detector 22 have an object detection range set as a region in which they can receive reflected waves of ultrasonic waves transmitted by themselves. The first detector 21 and the second detector 22 are attached such that the object detection ranges of two obstacle sensors 2 partially overlap.

Although the vehicle is provided with the first detector 21 and the second detector 22 that are two obstacle sensors 2, the present disclosure is not limited thereto. For example, a plurality of other obstacle sensors 2 such as corner sensors may be separately provided.

Figure 2:
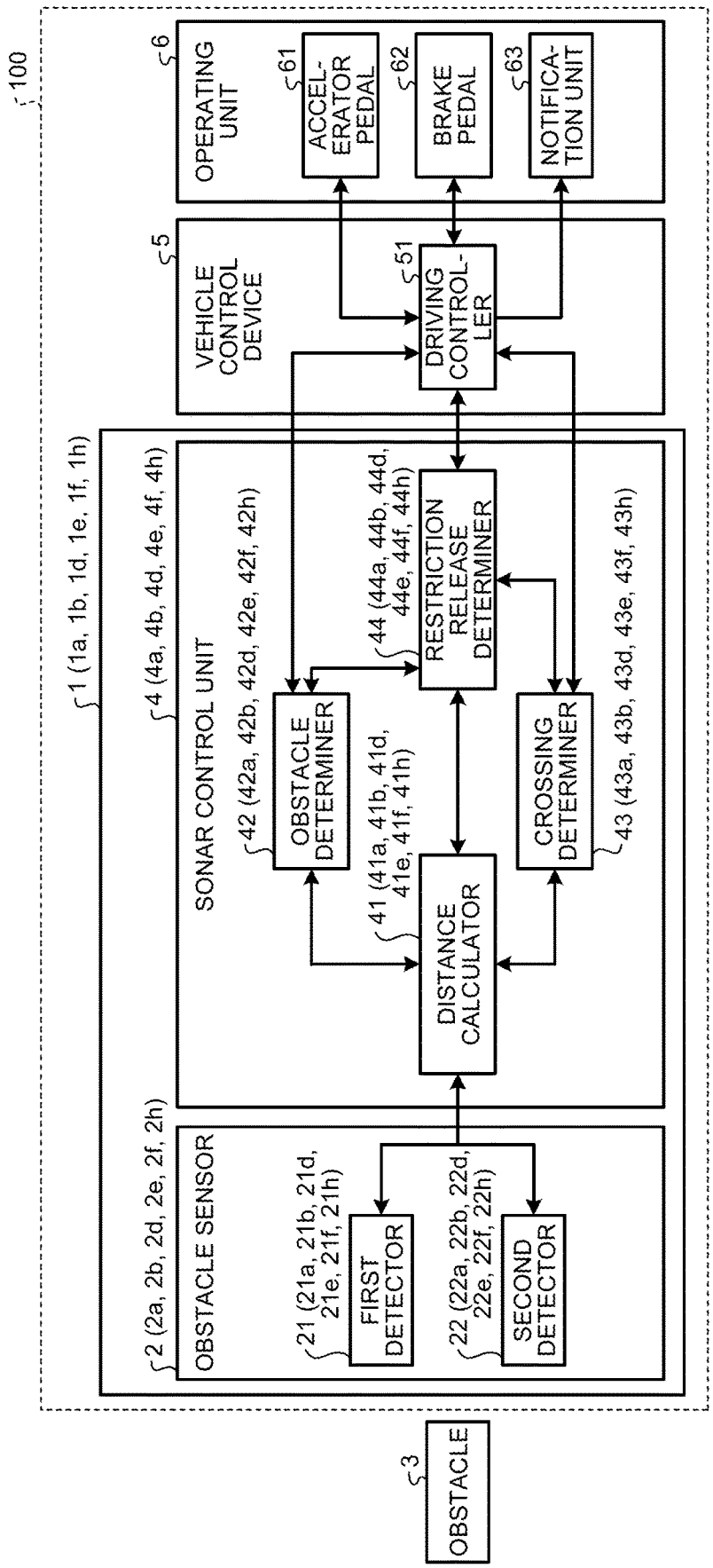
FIG. 2 is an exemplary functional block diagram of the object detection device according to a first embodiment.

A configuration of the object detection device 1 will now be described. FIG. 2 is a block diagram illustrating a configuration of the object detection device 1. The object detection device 1 includes the obstacle sensor 2 and a sonar control unit 4. The obstacle sensor 2 includes the first detector 21 and the second detector 22. The sonar control unit 4 includes a distance calculator 41, an obstacle determiner 42, a crossing determiner 43, and a restriction release determiner 44.

The sonar control unit 4 is mainly composed of a microcontroller including a processor such as a central processing unit (CPU), a read only memory (ROM), and a random access memory (RAM) and detects the presence or absence of an obstacle 3 around the vehicle based on detection information of the obstacle 3 received from the obstacle sensor 2.

The sonar control unit 4 generates a control signal through cooperation between the processor such as a CPU and a computer program (software) stored in the ROM or the like. The functions of the sonar control unit 4 are not necessarily implemented by software and may be implemented by a hardware configuration such as dedicated circuitry.

The object detection device 1 is connected to the vehicle control device 5. The vehicle control device 5 includes a driving controller 51. The vehicle control device 5 is connected to an operating unit 6. The operating unit 6 includes an accelerator pedal 61, a brake pedal 62, and a notification unit 63. Here, the vehicle control device 5 is an example of "driving controller" in the claims.

The first detector 21 and the second detector 22 each have a transmitter (not illustrated) and a receiver (not illustrated). The transmitter is composed of an ultrasonic microphone having a piezoelectric element, transmits an ultrasonic wave having a frequency equal to that of an input transmission signal to an object such as the obstacle 3, and outputs an electrical signal corresponding to the transmitted ultrasonic wave to the distance calculator 41. The transmitted ultrasonic wave is reflected by the object.

The receiver is composed of an ultrasonic microphone having a piezoelectric element in the same manner as the transmitter, receives an ultrasonic wave reflected by an object such as the obstacle 3, converts the received ultrasonic wave into an electrical signal, and outputs the electrical signal to the distance calculator 41. The transmitter and the receiver may be integrated or may be separated. The number of transmitters is not necessarily equal to the number of receivers. For example, the second detector may have no transmitter and only have a receiver, and the receiver of the second detector may receive an ultrasonic wave transmitted by the transmitter of the first detector.

The distance calculator 41 calculates the distance to an object based on the electrical signals output from the transmitter and the receiver. Specifically, the distance to an object is measured from signals output from the transmitter and the receiver, based on the time difference from transmission to reception of ultrasonic waves. The calculated distance is sent as an electrical signal to the obstacle determiner 42. Here, the object refers to a target including other vehicles, people, and walls.

The obstacle determiner 42 determines the presence or absence of an obstacle 3 based on an electrical signal sent from the distance calculator 41 and an electrical signal output from the receiver. Specifically, the obstacle determiner 42 has a threshold value, and if the signal strength (amplitude) output from the receiver is greater than the threshold value, the obstacle determiner 42 determines that an obstacle 3 is present. The determination of the presence or absence of an obstacle 3 by the obstacle determiner 42 may be performed before measurement of the distance to the object by the distance calculator 41. In this case, the distance calculator 41 measures the distance to the obstacle detected by the obstacle determiner 42 based on the time difference from transmission to reception of ultrasonic waves. As used herein the obstacle 3 is, for example, an object present within a predetermined distance from the vehicle 100 in the moving direction of the vehicle 100.

The obstacle determiner 42 may compare the signal strength (amplitude) output from the receiver with a threshold value multiple times, and if the signal strength (amplitude) is greater than the threshold value multiple times in succession, the obstacle determiner 42 may determine that an obstacle 3 is present. Even when the signal strength (amplitude) output from the receiver is greater than a threshold value, an obstacle need not be determined to be present, if the distance to the object is large based on the distance information sent from the distance calculator 41.

When it is determined that an obstacle 3 is present, the obstacle determiner 42 transmits obstacle information to the driving controller 51 in the vehicle control device 5. In this case, the driving controller 51 performs steering control, acceleration suppression control, and braking control of the vehicle 100 as hitting avoidance control to prevent the vehicle 100 from hitting against the obstacle 3. Alternatively, the notification unit 63 may give notification to alert the driver. The notification unit is, for example, a speaker and a display.

The distance calculator 41 not only calculates the distance to the obstacle 3 but also calculates the relative position of the obstacle 3 to the vehicle 100 using signal information obtained from the first detector 21 and the second detector 22, using the principle of triangulation.

In triangulation, the coordinates of a measurement point are calculated from the distance between two known points and the distance between each of the two known points and the measurement point.

Figure 3:
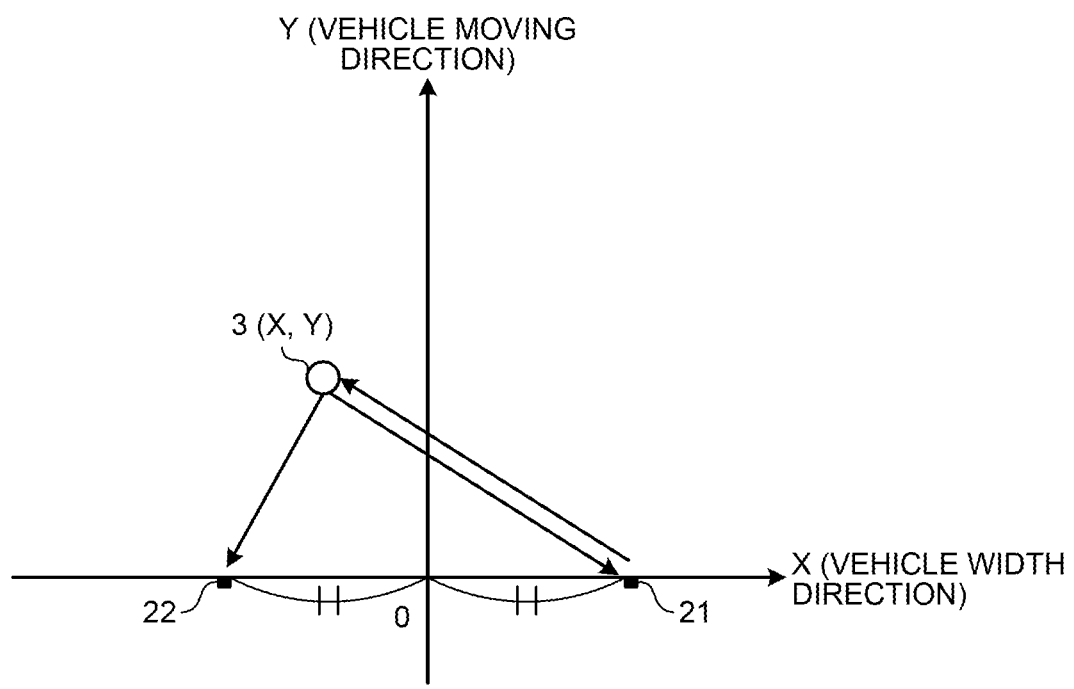
FIG. 3 is a diagram for explaining a method of calculating an estimated position of an obstacle.

FIG. 3 is a diagram for explaining a method of calculating the position of the obstacle 3. The first detector 21, the second detector 22, and the obstacle 3 located in front of the first detector 21 and the second detector 22 are illustrated in a plan view.

When the sensor transmitting an ultrasonic wave and the sensor receiving it are the same, the received ultrasonic wave is called a direct wave, and the sensor receiving the ultrasonic wave is called a direct detection sensor. On the other hand, when the sensor transmitting an ultrasonic wave and the sensor receiving it are different, the received ultrasonic wave is called an indirect wave, and the sensor receiving the ultrasonic wave is called an indirect detection sensor. In FIG. 3, the first detector 21 is a direct detection sensor that transmits an ultrasonic wave with its own transmitter and receives the ultrasonic wave with its own receiver, whereas the second detector 22 is an indirect detection sensor that receives an ultrasonic wave transmitted by the transmitter of the first detector 21 with its own receiver.

The distance calculator 41 sets a coordinate system in which a straight line passing through the first detector 21 and the second detector 22 is the X axis and a straight line passing through the middle between the first detector 21 and the second detector 22 and perpendicular to the X axis is the Y axis, and calculates the X and Y coordinates in the coordinate system as the position of the obstacle 3.

Specifically, when an ultrasonic wave is transmitted from the transmitter of the first detector 21 and the ultrasonic wave is reflected by the obstacle 3 and received as a direct wave by the receiver of the first detector 21, the distance calculator 41 calculates the distance between the first detector 21 and the obstacle 3 based on the direct wave.

When the reflected wave of the ultrasonic wave by the obstacle 3 is received as an indirect wave by the receiver of the second detector 22, the distance calculator 41 calculates the distance between the second detector 22 and the obstacle 3 based on the received indirect wave.

The distance from the origin O at the intersection of the X and Y axes to the first detector 21 is equal to the distance from the origin O to the second detector 22, and these distances are stored in advance in a memory (not illustrated) in the sonar control unit 4.

The distance calculator 41 calculates a first time t1 by subtracting the time when the transmitter of the first detector 21 transmits an ultrasonic wave from the time when the first detector 21 receives a direct wave. The distance calculator 41 also calculates a second time t2 by subtracting the time when the transmitter of the first detector 21 transmits an ultrasonic wave from the time when the second detector 22 receives an indirect wave.

A value obtained by multiplying the first time t1 by the speed of sound is a value twice the distance between the first detector 21 and the obstacle 3. A value obtained by multiplying the second time t2 by the speed of sound is the sum of the distance between the first detector 21 and the obstacle 3 and the distance between the second detector 22 and the obstacle 3.

The distance calculator 41 can determine the position by calculating the coordinates of the obstacle 3 by triangulation operations using the distance between the first detector 21 and the second detector 22, and the first time t1 and the second time t2 that are the measured times.

In FIG. 3, the first detector 21 is a direct detection sensor and the second detector 22 is an indirect detector, by way of example. However, the distance calculator 41 can determine the position of the obstacle 3 in the same way when the first detector 21 is an indirect detection sensor and the second detector 22 is a direct detection sensor.

Figure 4:
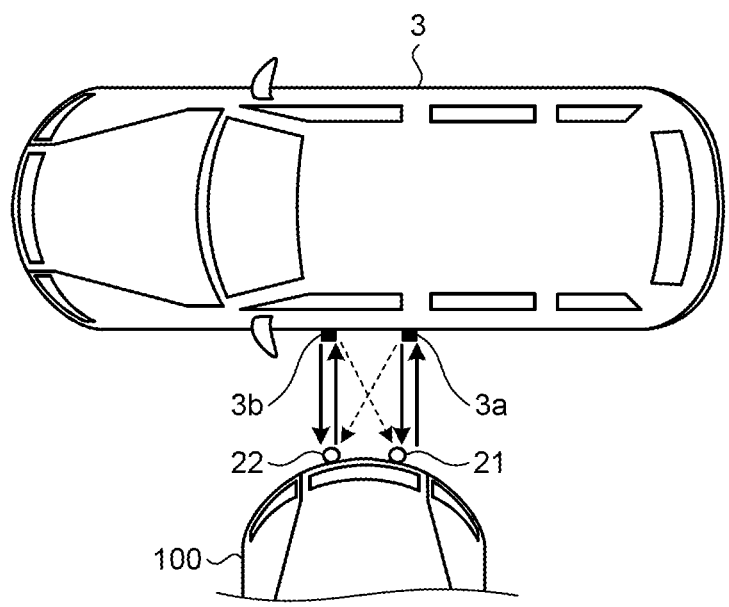
FIG. 4 is a diagram illustrating an object detection state when a second vehicle stops in front of a vehicle.

As illustrated in FIG. 4, a second vehicle may be present as an obstacle 3 so as to block the moving direction (in other words, the moving direction) of the vehicle 100. In this case, it can be determined whether there is an obstacle 3 blocking the moving direction of the vehicle 100, based on the detection results of the first detector 21 and the second detector 22. In FIG. 4, the first detector 21 and the second detector are each detecting an object. In FIG. 4, the moving direction (or moving direction) of the vehicle 100 is forward of the vehicle 100, by way of example. However, when the vehicle 100 moves backward, the moving direction of the vehicle 100 is backward of the vehicle 100, so it should be understood that the directions illustrated in the drawing and the wording in the description of the drawing should be replaced.

In FIG. 4, since a second vehicle is present as an obstacle 3 so as to block the moving direction (in other words, the moving direction) of the vehicle 100, the ultrasonic wave transmitted by the obstacle sensor 2 is reflected by a side surface of a second vehicle. The ultrasonic wave transmitted by the first detector 21 is reflected by a side surface of a second vehicle and is incident on the first detector 21 as a direct wave and incident on the second detector 22 as an indirect wave. One point of the side surface of the vehicle ahead is then detected as a first obstacle 3*a*.

In this case, whether the first obstacle 3*a* is present is determined based on whether the position of the first obstacle 3*a* is calculated stably in transmission of ultrasonic waves multiple times. For example, when the position of the first obstacle 3*a* can be calculated multiple times in succession, the obstacle determiner 42 determines that the first obstacle 3*a* is present.

Similarly, the ultrasonic wave transmitted by the second detector 22 is reflected by a side surface of a second vehicle and is incident on the second detector 22 as a direct wave and incident on the first detector 21 as an indirect wave. One point of the side surface of a second vehicle ahead is then detected as a second obstacle 3*b*. Whether the second obstacle 3*b* is present is determined based on whether the position of the second obstacle 3*b* is calculated stably, in the same manner as in the first obstacle 3*a*.

When the obstacle determiner 42 determines that the obstacle 3 of either the first obstacle 3*a* or the second obstacle 3*b* is present, the driving controller 51 performs driving restriction control of the vehicle 100, because if the vehicle 100 starts, the vehicle 100 may hit against the vehicle ahead that is the obstacle 3.

Driving restriction control includes, for example, acceleration suppression to suppress acceleration of the vehicle 100 when the driver operates the accelerator pedal 61, and braking control to brake the vehicle 100 even when the driver is not operating the brake pedal 62. Alternatively, the driving controller 51 may perform steering control to prevent hitting against the obstacle 3.

When the obstacle 3 is a second vehicle, it may stop in front of the vehicle 100 and then move to cross in front of the vehicle 100. For example, as illustrated in FIG. 5, when a state in which both of the first obstacle 3*a* and the second obstacle 3*b* are detected shifts to a state in which the first obstacle 3a is not detected and only the second obstacle 3b is detected, and then a second vehicle is no longer present in front of the vehicle 100, neither the first obstacle 3a nor the second obstacle 3b is detected.

Figure 5:
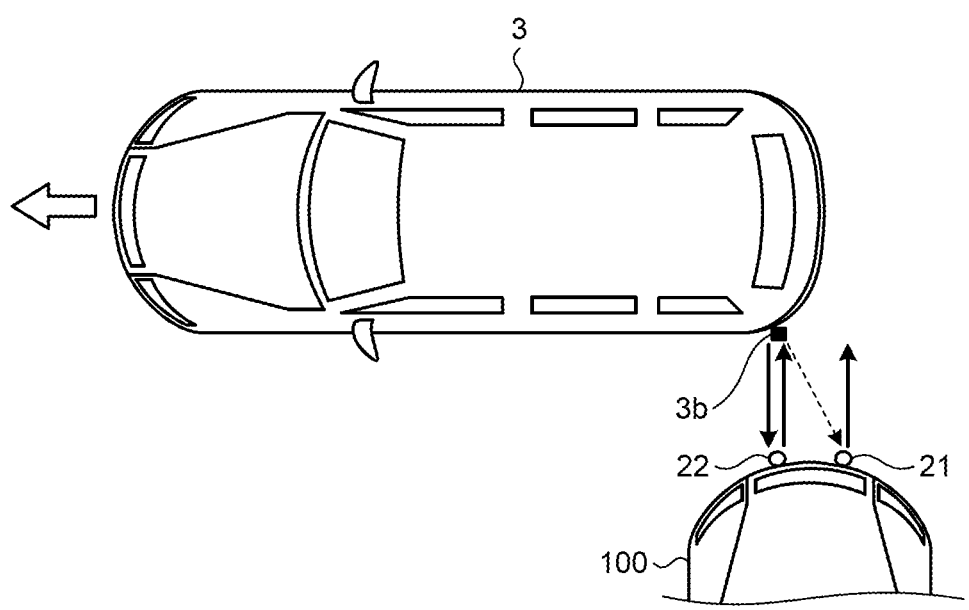
FIG. 5 is a diagram illustrating an object detection state when a second vehicle in front of a vehicle moves.

In FIG. 5, a second vehicle moves from the right to the left in front of the vehicle 100, by way of example. However, the same applies when a second vehicle moves from the left to the right in front of the vehicle 100. In this case, the obstacle sensor 2 installed at the left front of the vehicle 100 should read as the first detector 21, and the obstacle sensor 2 installed at the right front of the vehicle 100 should read as the second detector 22.

In this case, even though the driver of the vehicle 100 recognizes the movement of a second vehicle ahead, driving restriction control is applied until a second vehicle completely passes by in front of the vehicle 100. More specifically, driving restriction control is released after both of the first obstacle 3a and the second obstacle 3b become the non-detection state, so even if the driver recognizes the movement of a second vehicle ahead and presses on the accelerator, driving restriction control is exerted unless a second vehicle completely passes by in front of the vehicle 100 at the moment of pressing. Accordingly, the vehicle does not start, against the driver's will. A detection time lag also adversely affects the driving restriction control. In obstacle detection, in order to increase the reliability of the detection result, it is determined that "an obstacle is present" when an obstacle at the same distance continues being detected multiple times. Once it is determined that "an obstacle is present", the determination result is not immediately changed to "not detected" even when an obstacle is not detected once. The determination result is changed to "not detected" when the obstacle continues not being detected multiple times. Such a time delay in the change of detection results is the detection time lag. In other words, while the determination result "an obstacle is present" remains unchanged due to the detection time lag even after a second vehicle completely passes by in front of the vehicle 100, the driving restriction control is exerted and the vehicle does not start even if the accelerator is pressed.

Such driving restriction control is against the will of the driver who recognizes the movement of a second vehicle ahead, and therefore needs to be improved. The crossing determiner is therefore added to determine a situation in which a vehicle is crossing in front. At a time point when the crossing determiner 43 determines crossing of a second vehicle, the determination result is sent to the driving controller 51, and upon receiving the crossing determination, the driving controller 51 releases the driving restriction control of the vehicle 100, so that driving assistance as intended by the driver is performed.

Specifically, the crossing determiner 43 detects crossing of a second vehicle when a state in which both of the first obstacle 3a and the second obstacle 3b are detected (both of the first detector 21 and the second detector 22 are in the detection state) shifts to a state in which the first obstacle 3a is not detected and only the second obstacle 3b is detected (the first detector 21 is the non-detection state and the second detector 22 is in the detection state).

When the crossing determiner 43 determines crossing, the driving controller 51 releases the driving restriction control of the vehicle 100. In other words, acceleration suppression control or braking control of the vehicle 100 is released. Since the driver is likely to visually recognize a second vehicle crossing in front of the vehicle 100, releasing the driving restriction control of the vehicle 100 when crossing is detected can be driving assistance that is more likely to meet the driver's intention.

However, depending on the driving status of the vehicle 100 and the surrounding conditions of the vehicle 100, it may be better not to release the driving restriction control of the vehicle 100 in consideration of safety and the like. In the present embodiment, the object detection device 1 includes the restriction release determiner 44. The restriction release determiner 44 determines whether to release the driving restriction control depending on the driving status of the vehicle 100 and the surrounding conditions of the vehicle 100.

In other words, even when the crossing determiner 43 determines crossing of a second vehicle, the release of the driving restriction control is prohibited in consideration of the driver's safety, depending on the driving status of the vehicle 100 and the surrounding conditions of the vehicle 100. Here, the driving status of the vehicle 100 and the surrounding conditions of the vehicle 100 are examples of "predetermined condition" in the claims.

The term "crossing" means that a second vehicle that is an obstacle 3 passes by in a direction intersecting the moving direction of the vehicle 100 from a state in which it is present ahead or behind the vehicle 100 that is a moving object, and includes a situation in which a second vehicle comes from the right side in front of the vehicle 100 and then a second vehicle moves back to the right side. The crossing determination is performed not only when the moving direction is the forward direction but also when the moving direction is the backward direction. The installation location of the obstacle sensor is not limited to the front part of the vehicle, but rather the obstacle sensor is more often installed at the back part of the vehicle. The obstacle sensor is installed on the rear bumper of the vehicle to detect an obstacle not visible to the driver, because the driver has a clear vision in front of the vehicle, whereas the driver has a wide range of blind spot at the back. As an example of the situation in which the crossing determination is applied in backing, the own vehicle may be wanted to be backed to the back of a vehicle crossing behind the own vehicle through a path from when backing the own vehicle out from a position where the own vehicle is parked forward in a parking slot for double parking. The prior art discloses a crossing determination performed for a vehicle crossing the moving direction and is not limited to forward movement.

In the present embodiment, even when the crossing determiner 43 determines crossing of a second vehicle, the restriction release determiner 44 prohibits the release of the driving restriction control if the gear position of the vehicle 100 is the reverse position.

The restriction release determiner 44 determines a driving status of the vehicle 100 based on the gear position. The driving status is, for example, a status as to whether the vehicle 100 is moving forward or backward.

In other words, when the driving status of the vehicle 100 is moving backward, the restriction release determiner 44 prohibits the release of the driving restriction. This is because it is more difficult for the driver to check the safety of the surroundings of the vehicle 100 when the vehicle 100 moves backward than when it moves forward. Crossing of a second vehicle is determined when the second vehicle is detected at least in the moving direction of the vehicle 100, and if the second vehicle stops before completely passing by in the moving direction of the own vehicle, there is a risk that the corrosion occurs when the driving restriction is released to driving. In a normal situation, the obstacle sensor is designed to avoid a collision by performing driving restriction (deceleration or braking) when detecting an obstacle, but when driving restriction is released based on the crossing determination, driving restriction is not exerted, which may cause a collision. Even when driving restriction is not exerted, a collision does not occur in many cases as long as the driver keeps an eye in the moving direction, because the driver can press the brake pedal for braking when a second vehicle stops before completely passing by in the moving direction of the vehicle 100, or the driver can ease off the accelerator for deceleration when a second vehicle is slow and takes time to completely pass by in the moving direction of the vehicle 100. However, the driver sometimes has a limited view when backing and may keep backing without noticing the stop or the slowness of a second vehicle, which may result in a collision. Moreover, the driver of a vehicle equipped with obstacle sensors sometimes presses on the accelerator without sufficiently checking for safety, thinking that the brakes should be applied automatically when there is a risk of a collision. In this way, releasing the driving restriction based on the crossing determination in backing may cause a collision. The restriction release determiner 44 therefore prohibits the release of the driving restriction when the driver backs the vehicle 100.

When the restriction release determiner 44 prohibits the release of the driving restriction, driving restriction information is sent to the driving controller 51 in the vehicle control device 5. In this case, the driving controller 51 maintains acceleration suppression control or braking control of the vehicle 100.

Figure 6:
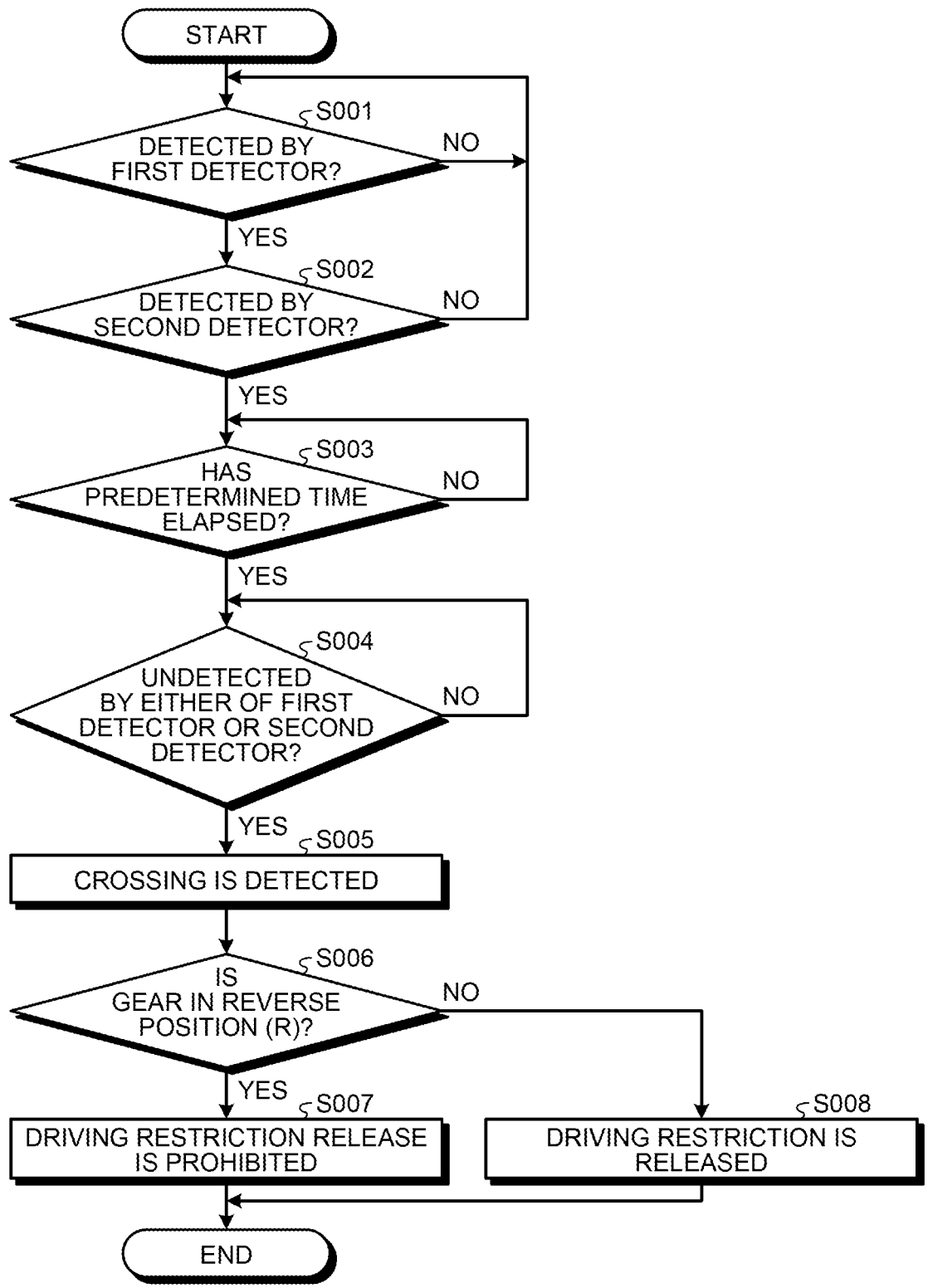
FIG. 6 is a flowchart illustrating the operation of a sonar control unit according to the first embodiment.

The operation of the sonar control unit 4 according to the present embodiment will be described using FIG. 6. FIG. 6 is a flowchart illustrating the operation of the sonar control unit 4. The flowchart illustrated in FIG. 6 is started when the ignition of the vehicle 100 is turned on, and is performed each time the obstacle sensor 2 transmits an ultrasonic wave.

First, at step S001, the obstacle determiner 42 determines whether the first obstacle 3a is detected, based on a received wave signal from the first detector 21. If the obstacle determiner 42 determines that the first obstacle 3a is detected (Yes at step S001), the process moves to step S002. If the obstacle determiner 42 determines that the first obstacle 3a is undetected (No at step S001), the process returns prior to step S001. If the obstacle determiner 42 detects the first obstacle 3a, the distance calculator 41 calculates the distance to the first obstacle 3a. If the obstacle determiner 42 detects the first obstacle 3a at S0001, the obstacle determiner 42 notifies the driving controller 51 that an obstacle is detected, and consequently, the driving controller 51 performs driving restriction control.

Subsequently, at step S002, the obstacle determiner 42 determines whether the second obstacle 3b is detected, based on a received wave signal from the second detector 22. If the obstacle determiner 42 determines detection (Yes at step S002), the process moves to step S003. If the obstacle determiner 42 determines that the second obstacle 3b is not detected (No at step S002), the process returns prior to step S001. If the obstacle determiner 42 detects the second obstacle 3b, the distance calculator 41 calculates the distance to the second obstacle 3b.

Step S001 and step S002 are in no particular order. The obstacle determiner 42 may detect the first obstacle 3a based on a received wave signal from the first detector 21, after detecting the second obstacle 3b based on a received wave signal from the second detector 22. The obstacle determiner 42 may simultaneously determine detection of the first obstacle 3a and the second obstacle 3b.

At step S003, a timer in the sonar control unit 4 measures whether a predetermined time (for example, three seconds) has elapsed. If a predetermined time has elapsed (Yes at step S003), the process moves to step S004. If a predetermined time has not elapsed (No at step S003), the process returns prior to step S003. The step at which the timer determines whether a predetermined time has elapsed is not essential in the present embodiment.

At step S004, the obstacle determiner 42 determines whether either the first obstacle 3a or the second obstacle 3b is undetected, based on the received wave signals from the first detector 21 and the second detector 22. If the obstacle determiner 42 determines that either the first obstacle 3a or the second obstacle 3b is undetected (Yes at step S004), the process moves to step S005.

If the obstacle determiner 42 determines that both of the first obstacle 3a and the second obstacle 3b keep detected (No at step S004), the process returns prior to step S004.

At step S005, the crossing determiner 43 receiving obstacle information as a signal from the obstacle determiner 42 and the distance calculator 41 determines that crossing of a second vehicle has occurred. If the crossing determiner 43 determines crossing of a second vehicle, it moves to step S006 in the flowchart. The information on crossing of a second vehicle is sent as a signal to the restriction release determiner 44.

At step S006, the restriction release determiner 44 receives gear position information from driving information held by the vehicle control device 5. If the gear is in the reverse position (R) (Yes at step S006), the restriction release determiner 44 transmits information to the driving controller 51 to prohibit the release of the driving restriction control. In other words, the driving controller 51 controls the vehicle 100 to maintain acceleration suppression control or braking control of the vehicle 100 (step S007).

If the gear is in a position other than the reverse position, such as parking position (P) or forward position (D) (No at step S006), the restriction release determiner 44 transmits information to the driving controller 51 to release the driving restriction control. In other words, the driving controller 51 controls the vehicle 100 to release acceleration suppression control or braking control of the vehicle 100 (step S008).

At step S007 and step S008, the flowchart ends. The control performed by the driving controller 51 is not limited to acceleration suppression control and braking control. The driving controller 51 may perform steering control of the vehicle 100.

This is the end of description of the object detection device 1 according to the first embodiment. In the present embodiment, the restriction release determiner 44 does not necessarily reside in the sonar control unit 4. For example, it may reside in the vehicle control device 5. The driving controller 51 may reside in the object detection device 1. In the description above, the distance calculator 41, the obstacle determiner 42, the crossing determiner, and the restriction release determiner 44 have different functions but they may have common or shared functions.

In the present embodiment, the restriction release determiner 44 receives gear position information as the driving status of the vehicle 100 from the driving controller 51 and then determines whether to prohibit the driving restriction release, thereby enabling driving assistance as intended by the driver, depending on the situation.

Second Embodiment

A second embodiment embodied as an object detection device 1a mounted on the vehicle 100 will be described below with reference to the drawings. The block diagram of the object detection device 1*a* according to the present embodiment is similar to FIG. 2 in the first embodiment and therefore omitted. The principle of detecting the position of the obstacle 3 is also similar and therefore omitted.

The object detection device 1*a* according to the present embodiment differs from the object detection device 1 according to the first embodiment in the condition by which a restriction release determiner 44*a* prohibits the release of the driving restriction control.

Specifically, even when a crossing determiner 43*a* determines crossing of a second vehicle, the restriction release determiner 44*a* prohibits the release of the driving restriction control if the operation on the accelerator pedal 61 is detected at a time point when from a state in which a first detector 21*a* and a second detector 22*a* respectively detect the first obstacle 3*a* and the second obstacle 3*b*, a state in which it is undetected by an obstacle sensor 2*a* of either the first detector 21*a* or the second detector 22*a* is reached. The information of prohibiting the release of the driving restriction control is sent as a signal to the driving controller 51 in the vehicle control device 5.

In other words, if the accelerator pedal 61 of the vehicle 100 is operated by the driver at a time point when the crossing determiner 43 determines crossing of a second vehicle, the driving controller 51 maintains driving restriction control of the vehicle. For operation information of the accelerator pedal 61, the restriction release determiner 44 receives the information from the driving controller 51.

The above control is performed because when the accelerator pedal 61 of the vehicle 100 is operated by the driver, the vehicle 100 may start suddenly at the time of crossing determination by the crossing determiner 43*a*, and it may be difficult to avoid hitting against a second vehicle. The risk of hitting against a second vehicle can be reduced even when the driver presses on the accelerator at the time of crossing determination by the crossing determiner 43*a*.

Figure 7:
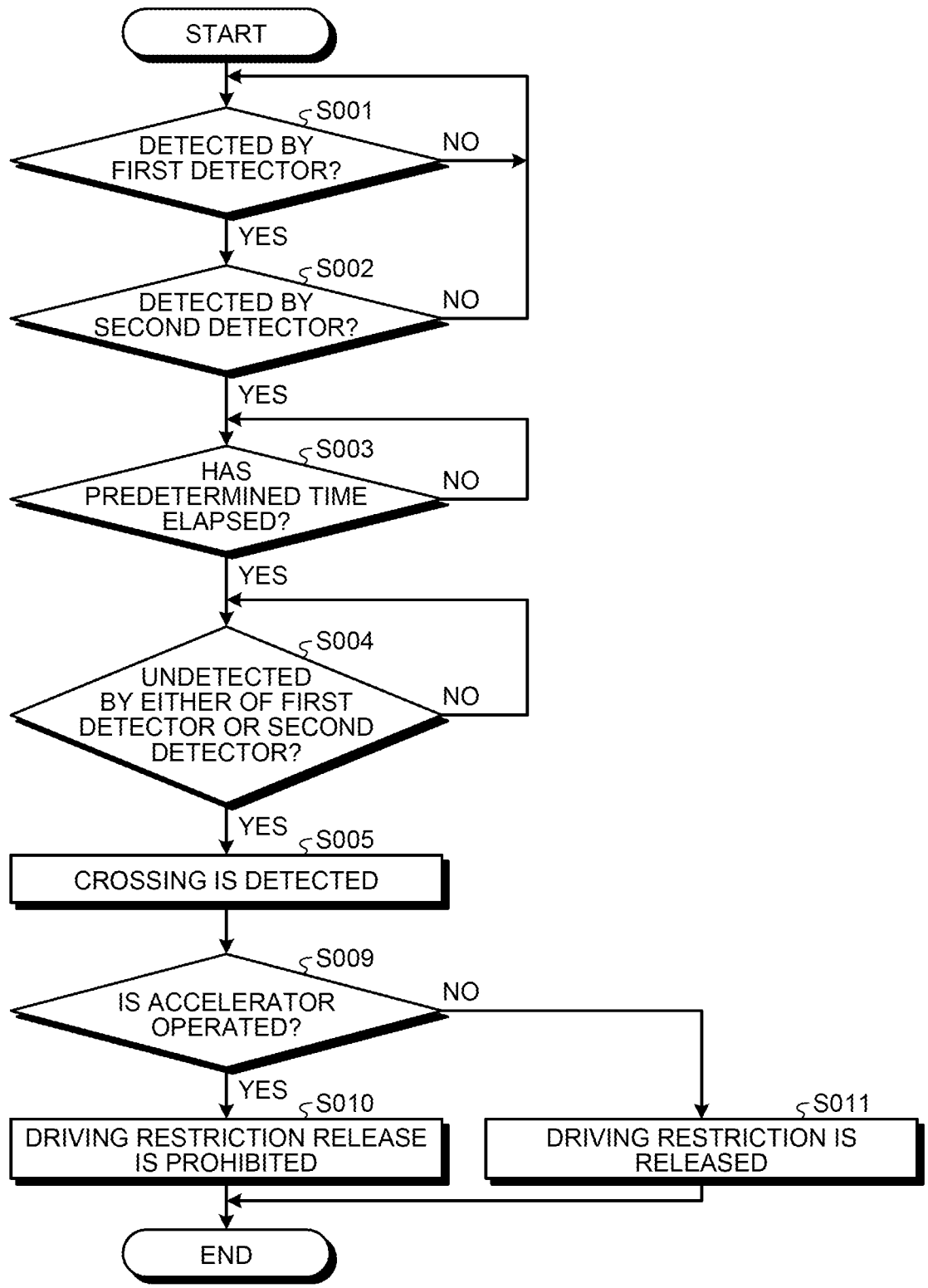
FIG. 7 is a flowchart illustrating the operation of the sonar control unit according to a second embodiment.

The operation of a sonar control unit 4*a* according to the present embodiment will be described using FIG. 7. FIG. 7 is a flowchart illustrating the operation of the sonar control unit 4*a*. The flowchart illustrated in FIG. 7 is started when the ignition of the vehicle 100 is turned on, and is performed each time an obstacle sensor 2*b* transmits an ultrasonic wave. Step S001 to step S005 are similar to those in the first embodiment and will not be further elaborated.

After step S005, it moves to step S009 in the flowchart. At step S009, the restriction release determiner 44*a* receives information on whether the driver is operating the accelerator of the vehicle 100, from driving information held by the vehicle control device 5. If the driver is operating the accelerator (Yes at step S009), the restriction release determiner 44*a* transmits information to the driving controller 51 to prohibit the release of the driving restriction control. In other words, the driving controller 51 controls the vehicle 100 to maintain acceleration suppression control or braking control of the vehicle 100 (step S010).

If the driver is operating the accelerator (Yes at step S009), it is preferable that the sonar control unit 4*a* causes the notification unit 63 in the operating unit 6 to give notification to ask the driver not to operate the accelerator pedal 61.

The notification to the driver is provided by visual information, audio information, or any other method that conveys instructions to the driver. Instead of the notification to ask the driver not to operate the accelerator pedal 61, a notification to ask the driver to operate the brake pedal 62 may be given.

If the driver is not operating the accelerator (No at step S009), the restriction release determiner 44 transmits information to the driving controller 51 to release the driving restriction control. In other words, the driving controller 51 controls the vehicle 100 to release acceleration suppression control or braking control of the vehicle 100 (step S011). At step S010 and step S011, the flowchart ends.

(Modification)

In the foregoing embodiment, the release of the driving restriction control is prohibited if the accelerator pedal 61 of the vehicle 100 is operated by the driver at a time point when the crossing determiner 43 determines crossing of a second vehicle. However, the restriction release determiner 44*a* may prohibit the release of the driving restriction control if the brake pedal 62 of the vehicle 100 is not operated by the driver when the crossing determiner 43 determines crossing of a second vehicle. In other words, in the flowchart in FIG. 7, step S009 "accelerator is operated" may be replaced by step S009 "brake is not operated".

The above control is performed because if the brake pedal 62 of the vehicle 100 is not operated by the driver, the vehicle 100 may start suddenly and collide with a second vehicle when the crossing determiner 43*a* determines crossing of a second vehicle. If the driver steps on the brakes when the crossing determiner 43*a* determines crossing of a second vehicle, the driver can stop the vehicle simply by depressing the pedal, thereby reducing the risk of colliding with a second vehicle even if the vehicle 100 moves forward.

In the present modification, at step S009, the restriction release determiner 44*a* receives information on whether the driver is operating the brakes of the vehicle 100 from driving information held by the vehicle control device 5. If the driver is not operating the brakes (Yes at step S009), the restriction release determiner 44*a* transmits information to the driving controller 51 to prohibit the release of the driving restriction control. In other words, the driving controller 51 controls the vehicle 100 to maintain acceleration suppression control or braking control of the vehicle 100 (step S010). If the driver is not operating the brakes, it is preferable that the sonar control unit 4*a* causes the notification unit 63 in the operating unit 6 to give notification to ask the driver to operate the brake pedal 62.

If the driver is operating the brakes (No at step S010), the restriction release determiner 44 transmits information to the driving controller 51 to release the driving restriction control. In other words, the driving controller 51 controls the vehicle 100 to release acceleration suppression control or braking control of the vehicle 100 (step S011). At step S010 and step S011, the flowchart ends.

At step S009 in the present modification, the restriction release determiner 44*a* determines whether to prohibit the release of the driving restriction control, depending on whether the driver of the vehicle 100 is operating the brakes. However, the modification is not limited thereto.

Operating the brakes may include the case when the brakes are not depressed. In an automatic car, even when the accelerator is not depressed, the car can move forward at a low speed by creeping as long as the brakes are not depressed. If the driver puts the foot on the brake pedal 62, the driver can stop the vehicle 100 by depressing the brake pedal immediately when a danger arises. Putting the foot on the brake pedal 62 is therefore safer than not operating the brakes. For example, whether the driver of the vehicle 100 puts the foot on the brake pedal 62 may be detected, and the restriction release determiner 44*a* may determine whether to prohibit the release of the driving restriction control, depending on the detection result. The time point to determine whether the brakes are being operated at step S009 is not limited to the moment when crossing is detected at step S005. When from a state in which the first detector 21*a* and the second detector 22*a* respectively detects the first obstacle 3*a* and the second obstacle 3*b*, a state in which it is undetected by the obstacle sensor 2*a* of either the first detector 21*a* or the second detector 22*a* is reached and crossing is determined, the release of the driving restriction control may be prohibited even not at the moment of determining the crossing, if the brakes are not being operated. More specifically, it may be assumed that crossing is determined while at least one of a first detector 21*c* and a second detector 22*c* is detecting an obstacle. In other words, even after the driver is operating the brakes at a time point when crossing is determined and the release of the driving restriction control is performed, the release of the driving restriction control is prohibited if the brakes stop being operated while an obstacle ahead is being detected. With this control, even after crossing is determined and the vehicle starts moving forward, if a state in which braking works by depressing the pedal is not maintained, the driving restriction control is performed again to stop the vehicle 100, thereby further reducing the risk of hitting against a vehicle ahead. This control may give the driver uncomfortable feeling because lifting the foot off the brake pedal applies braking. It is therefore preferable that the sonar control unit 4*a* causes the notification unit 63 in the operating unit 6 to give notification to ask the driver to keep operating the brake pedal 62, such as "Please ease off the brake and move forward" even when the driver is operating the brakes.

This is the end of description of the object detection device 1*a* according to the second embodiment.

In the present embodiment, the restriction release determiner 44 receives driver's accelerator operation information or brake operation information as the driving status of the vehicle 100 from the driving controller 51 and then determines whether to prohibit driving restriction release. The object detection device 1*a* of the present embodiment therefore achieves effects similar to those of the first embodiment and can further reduce the risk of hitting against a second vehicle because the driver is pressing on the accelerator at the time of crossing determination.

Third Embodiment

A third embodiment embodied as an object detection device 1*b* mounted on a moving object will be described below with reference to the drawings. The block diagram of the object detection device 1*b* according to the present embodiment is similar to FIG. 2 in the first embodiment and therefore omitted.

The object detection device 1*b* according to the present embodiment differs from the object detection device 1 according to the first embodiment in the condition by which a restriction release determiner 44*b* prohibits the release of the driving restriction control.

When the present embodiment is applied, it is possible to handle a case where the obstacle detected by one of the detectors is a fixed object such as a wall or a concrete pillar, rather than a second vehicle. Even when the obstacle detected by the other of the detectors is a vehicle, moves from in front of the own vehicle 100 and is no longer detected, the wall or the pillar that is a fixed object is not crossing, so the release of braking must be prohibited in order to avoid a collision of the vehicle 100 with the fixed object. Specifically, even when a crossing determiner 43*b* determines crossing of a second vehicle (when from a state in which a first detector 21*b* and a second detector 22*b* respectively detect the first obstacle 3*a* and the second obstacle 3*b*, a state in which it is undetected by the obstacle sensor 2*b* of either the first detector 21*b* or the second detector 22*b* is reached), the restriction release determiner 44*b* prohibits the release of the driving restriction control if the variance of distance information to the second obstacle 3*b* detected by the second detector 22*b* is equal to or less than a threshold value. The information of prohibiting the release of the driving restriction control is sent as a signal to the driving controller 51 in the vehicle control device 5.

In other words, for example, when a second vehicle crosses from the right to the left in front of the own vehicle, the restriction release determiner 44*b* prohibits the release of the driving restriction control if the variance of distance information from the vehicle 100 to the second obstacle 3*b* detected by the second detector 22*b* that is the obstacle sensor 2*b* on the left and calculated by a distance calculator 41*b* is equal to or less than a threshold value.

As illustrated in FIG. 1, the obstacle sensor 2*b* actually transmits an ultrasonic wave having a spread (object detection range) in the vehicle width direction (horizontal direction) and in the height direction (vertical direction) orthogonal to the moving direction and the vehicle width direction. Since the obstacle 3 is an object with a width and a height in the horizontal direction and the vertical direction, the obstacle sensor 2*b* receives a received wave signal of a reflected wave corresponding to each point on the obstacle 3.

The distance calculator 41*b* therefore calculates the distance from the vehicle 100 to each point on the obstacle 3, using the time when the obstacle sensor 2*b* transmits an ultrasonic wave and the time when the obstacle sensor 2*b* receives a reflected wave corresponding to each point on the obstacle 3.

Here, if the obstacle 3 is a second vehicle, the distance from the vehicle 100 to each point on the obstacle 3 varies. This is because an object such as a vehicle has protrusions and depressions on its surface and thus causes a difference between the times when ultrasonic waves reflected from a depression and a protrusion arrive at the obstacle sensor 2*b*. For example, there is a difference in detected distance between a side surface of the vehicle body and the wheel, because the wheel is more depressed than the side surface of the vehicle body. There is a difference also in strength of reflected waves, because the vehicle body and the tire are made of different materials.

On the other hand, when the obstacle 3 is an object with relatively fewer protrusions and depressions, such as a wall, the detected distance is generally constant, but the detected distance fluctuates due to the wind or the like. This is called detection fluctuations. However, the variation generated by the detection fluctuations is smaller than the variation due to protrusions and depressions, which occurs when the obstacle 3 is a second vehicle. The magnitude of variation is therefore evaluated to determine whether the obstacle 3 is an object with protrusions and depressions such as a second vehicle or an object such as a wall.

A statistical index called variance is used as a measure to evaluate such variation. Variance is a value that expresses the degree of dispersion of data. The greater the dispersion of data is, the greater the variance is. Variance can be calculated by taking the average of squared deviations (the difference between a value and the mean).

An obstacle determiner 42*b* determines whether the variance of the distance information obtained by the distance calculator 41b is equal to or less than a threshold value. If the variance of the distance information is equal to or less than a threshold value, the obstacle determiner 42b determines that the obstacle 3 is a fixed object such as a wall. The determination result is sent to the restriction release determiner 44b.

Even when the crossing determiner 43b detects crossing, the restriction release determiner 44b prohibits the release of the driving restriction control if the obstacle determiner 42b determines that the obstacle 3 is a fixed object such as a wall (if the variance of the determination distance information is equal to or less than a threshold value).

Even when the crossing determiner 43b determines crossing of a second vehicle (when from a state in which the first detector 21b and the second detector 22b respectively detect the first obstacle 3a and the second obstacle 3b, a state in which it is undetected in the obstacle sensor 2b of either the first detector 21b or the second detector 22b is reached), crossing of a second vehicle has actually not occurred in some cases.

A new embodiment described below can be applied to handle a case where the obstacle detected by two detectors is not a second vehicle but a fixed object such as a wall or a concrete pillar. A wall or a pillar, even detected by both detectors, may become undetected as an obstacle by one of the detectors. In this case, since the wall or the pillar that is a fixed object does not cross, the release of braking must be prohibited in order to avoid a collision of the vehicle 100 with the fixed object. The ultrasonic waves transmitted by the obstacle sensor 2b are susceptible to wind and outside temperature. This is because the attenuation rate of ultrasonic waves changes with wind speed and outside temperature states. In addition, one reflected wave may be weaker than the other reflected wave due to the difference in angles of obstacle surfaces to the detector or in materials. If the strength of the reflected wave changes from slightly above to slightly below a threshold value by which an obstacle is detected, the obstacle is no longer detected. Due to such an influence of the surrounding conditions of the vehicle 100, the crossing determiner 43b may erroneously detect that crossing has occurred, although a second vehicle is not crossing. The control in the present embodiment can be performed to reduce the risk of a collision with the obstacle 3 even when the crossing determiner 43b erroneously detects the obstacle 3 as crossing of a second vehicle due to detection fluctuations.

The object detection device 1b according to the present embodiment can properly determine crossing by evaluating the variance of the distance information from the vehicle 100 to the second obstacle 3b detected by the second detector 22b and calculated by the distance calculator 41b as the surrounding condition of the vehicle 100.

Figure 8:
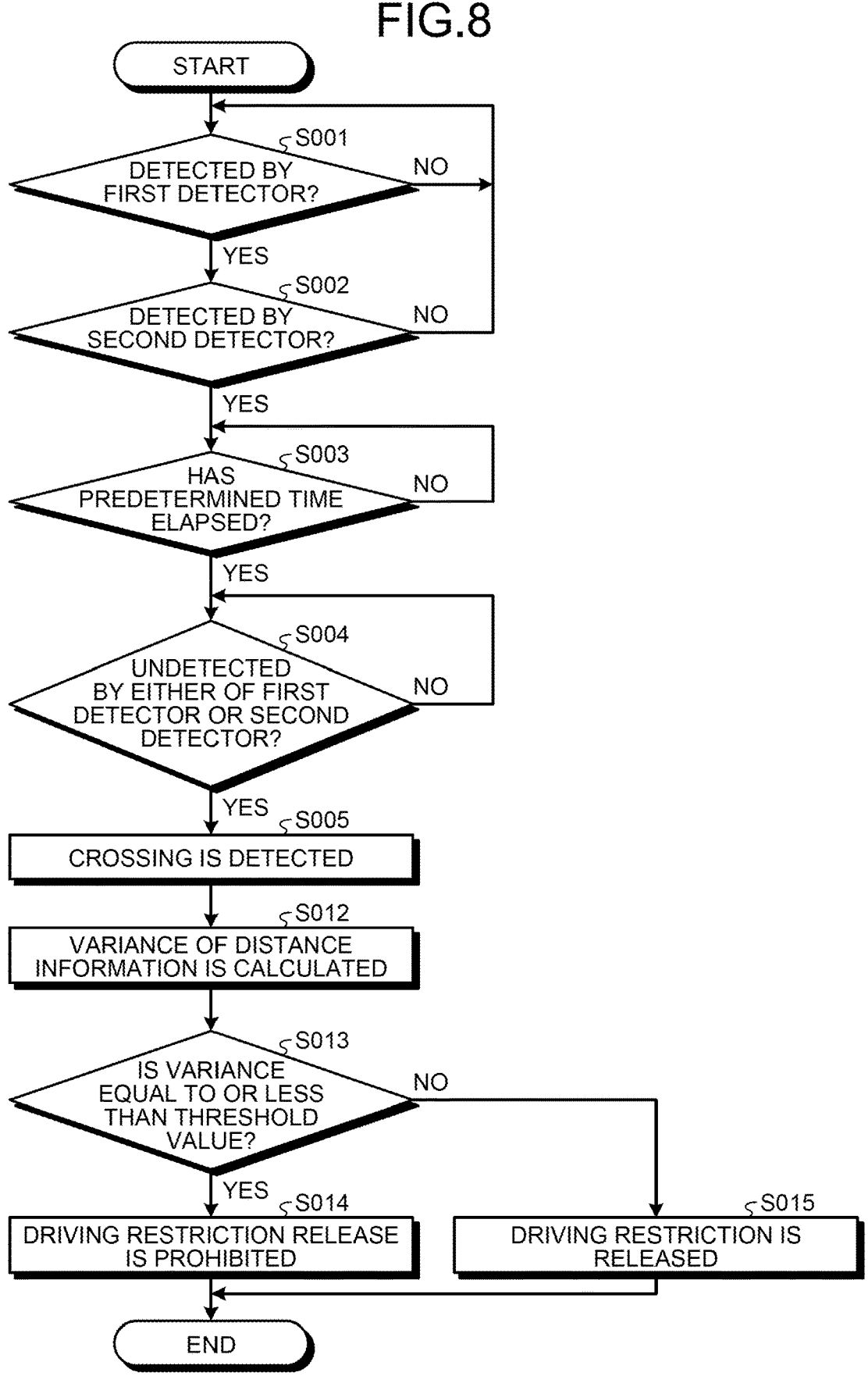
FIG. 8 is a flowchart illustrating the operation of the sonar control unit according to a third embodiment.

The operation of a sonar control unit 4b according to the present embodiment will be described using FIG. 8. FIG. 8 is a flowchart illustrating the operation of the sonar control unit 4b. The flowchart illustrated in FIG. 8 is started when the ignition of the vehicle 100 is turned on, and is performed each time the obstacle sensor 2b transmits an ultrasonic wave. Step S001 to step S005 are similar to those in the first embodiment and will not be further elaborated.

After step S005, it moves to step S012 in the flowchart. At step S012, the distance calculator 41b calculates the variance of the distance information to the second obstacle 3b detected by the second detector 22b. The distance calculator 41b sends the calculated variance information to the obstacle determiner 42b, and it moves to step S013 in the flowchart.

At step S013, the obstacle determiner 42b determines whether the variance obtained from the distance calculator 41b is equal to or less than a threshold value. If the variance of the distance information is equal to or less than a threshold value (Yes at step S013), the restriction release determiner 44a transmits information to the driving controller 51 to prohibit the release of the driving restriction control (step S014).

If the variance of the distance information is greater than a threshold value (No at step S013), the restriction release determiner 44 transmits information to the driving controller 51 to release the driving restriction control (step S015). At step S014 and step S015, the flowchart ends. In the present embodiment, the variance of the distance information is calculated by the distance calculator 41b. However, the variance of the distance information may be calculated by the obstacle determiner 42b.

(Modification)

In the foregoing embodiment, the release of the driving restriction control is prohibited when the variance of the distance information to an obstacle detected by the second detector 22b is equal to or less than a threshold value. However, in the present modification, the restriction release determiner 44a prohibits the release of the driving restriction control when the variance of strength (amplitude) information of the received wave signal detected by the second detector 22b is equal to or less than a threshold value.

The variance of strength information of the received wave signal detected by the second detector 22b is similar to the variance of distance information to the obstacle detected by the second detector 22b in that the variance of strength information of the received wave signal detected by the second detector 22b is smaller when the obstacle 3 is an object with relatively fewer protrusions and depressions, such as a wall, than when the obstacle 3 is a second vehicle.

This is because as the variation in distance is greater, the variation in degree of attenuation is greater, and consequently, the variation in strength of the received wave signal is also greater.

The variation in strength of the received wave signal is therefore evaluated to determine whether the obstacle 3 is an object with protrusions and depressions such as a second vehicle or an object such as a wall. This is the end of description of the object detection device 1a according to the second embodiment.

In the present embodiment, the restriction release determiner 44 obtains the variance of the distance information from the vehicle 100 to the obstacle 3 detected by the second detector 22b or the variance of the strength information of the received wave signal detected by the second detector 22b, as the surrounding condition of the vehicle 100, from the obstacle determiner 42b, and then determines whether to prohibit the driving restriction release. The object detection device 1b of the present embodiment therefore has effects similar to those of the first embodiment and in addition can perform appropriate driving assistance by determining whether the obstacle 3 is an object with protrusions and depressions such as a second vehicle or an object such as a wall. In the present embodiment, variance is used as an index to evaluate the degree of dispersion of data. However, a standard deviation may be used.

Fourth Embodiment

A fourth embodiment embodied as an object detection device 1c mounted on a moving object will be described below with reference to the drawings.

Figure 9:
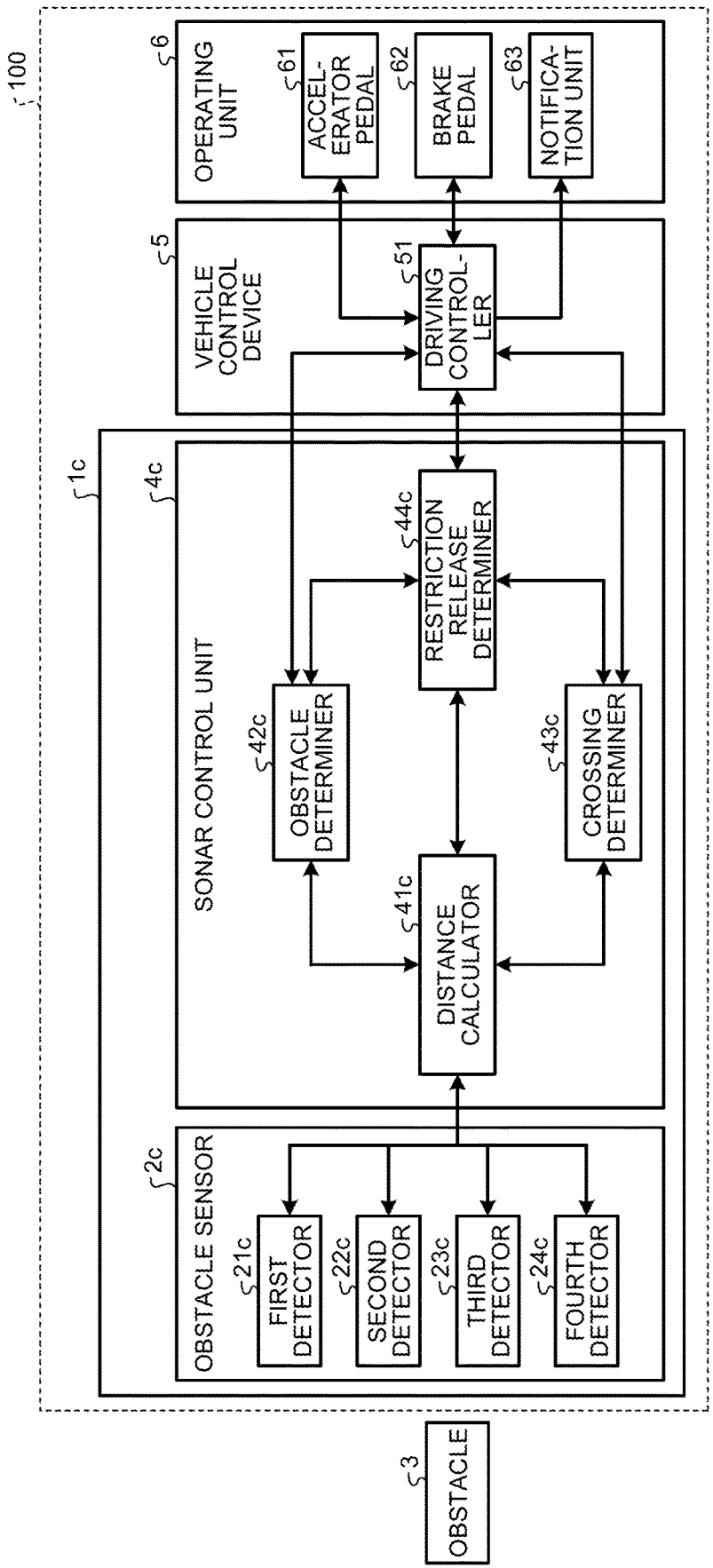
FIG. 9 is an exemplary functional block diagram of the object detection device according to a fourth embodiment.

FIG. 9 is a block diagram of the object detection device 1c according to the present embodiment. The object detection device 1c according to the present embodiment differs from the object detection device 1 according to the first embodiment in that it further includes a third detector 23c and a fourth detector 24c as an obstacle sensor 2c.

The third detector 23c is installed at the right front of the vehicle 100 and installed outside the first detector 21c on the vehicle. The fourth detector 24c is installed at the left front of the vehicle and installed outside the second detector 22c on the vehicle. The third detector 23c and the fourth detector 24c serve as corner sensors that detect an obstacle 3 in the diagonal direction of the vehicle 100.

The first detector 21c to the fourth detector 24c may be installed at the back of the vehicle 100, rather than the front of the vehicle 100. In the present embodiment, the fourth detector 24c is not essential, and the object detection device 1c at least includes the first detector 21c to the third detector 23c.

The object detection device 1c according to the present embodiment differs from the object detection device 1 according to the first embodiment in the condition by which a restriction release determiner 44c prohibits the release of the driving restriction control.

Specifically, when a crossing determiner 43c determines crossing of a second vehicle (when from a state in which the first detector 21c and the second detector 22c respectively detect the first obstacle 3a and the second obstacle 3b, a state in which it is undetected by the obstacle sensor 2c of either the first detector 21c or the second detector 22c is reached), an obstacle determiner 42c determines whether the third detector 23c is detecting a third obstacle 3c.

If the obstacle determiner 42c detects the third obstacle 3c in the right front of the vehicle 100, based on the received wave signal of the third detector 23c, the detection signal is sent to the restriction release determiner 44c. The restriction release determiner 44c prohibits the release of the driving restriction control if the obstacle 3 is detected by the third detector 23c, even when the crossing determiner 43c determines that crossing of a second vehicle has occurred. A signal for prohibiting the release of the driving restriction control is sent to the driving controller 51.

Figure 10:
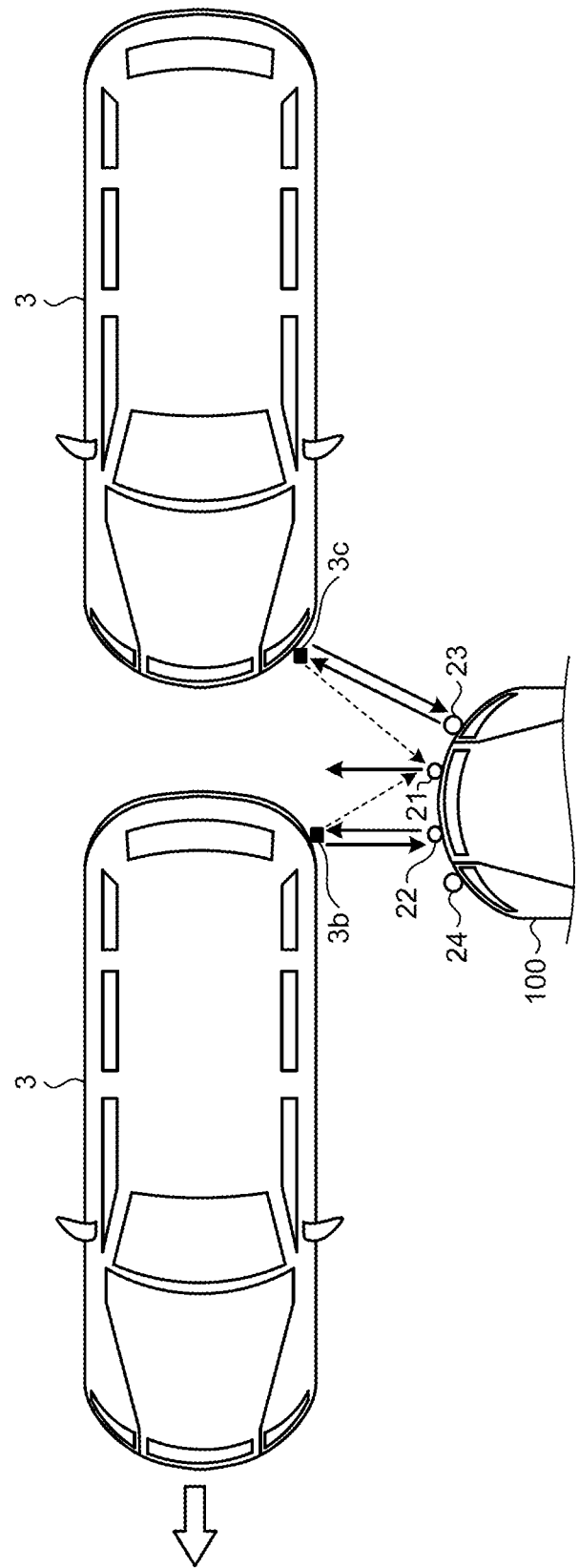
FIG. 10 is a diagram illustrating an object detection state when there is a vehicle behind a second vehicle.

The reason for performing the above control is that, as illustrated in FIG. 10, for example, a vehicle behind a second vehicle may be present in the right front of the vehicle 100 even when a second vehicle is crossing from the right to the left in front of the vehicle 100. If the driving restriction control is released in such a case, it may be difficult to avoid hitting of the vehicle 100 against the vehicle behind. The restriction release determiner 44c can prohibit the release of the driving restriction control to reduce the risk of hitting of the vehicle against the vehicle behind.

Figure 11:
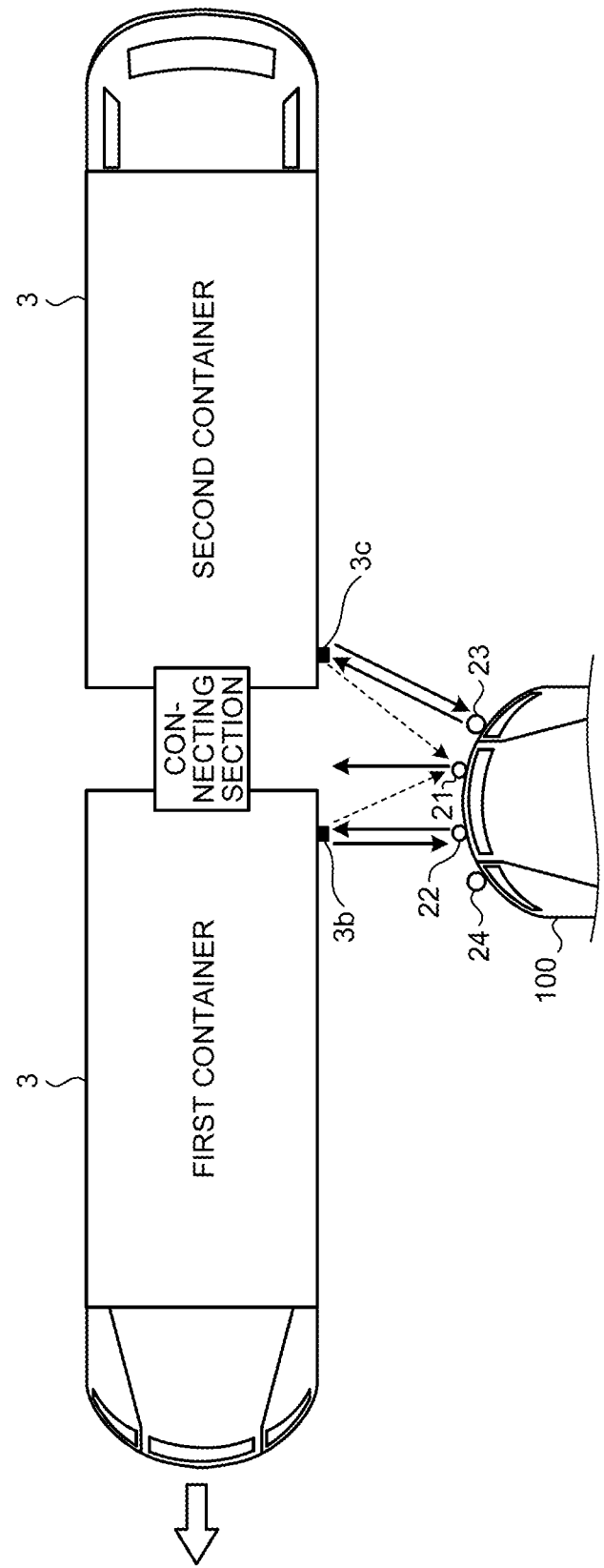
FIG. 11 is a diagram illustrating an object detection state when a second vehicle is a trailer with a first container and a second container connected.

The above control is also effective when, as illustrated in FIG. 11, a second vehicle is a trailer with a first container and a second container connected and the trailer is crossing from the right to the left in front of the vehicle 100. At the container-connecting section where a plurality of containers are connected, a reflective surface that reflects an ultrasonic wave transmitted by the obstacle sensor 2c is small so that the obstacle 3 may be undetected. However, the second container is present as the obstacle 3 behind the container-connecting section.

The third detector 23c therefore detects the second container as the third obstacle 3c and the driving restriction release of the vehicle 100 is prohibited even when a state in which the first detector 21c and the second detector 22c respectively detect the first obstacle 3a and the second obstacle 3b changes to a state in which the first detector 21c does not detect the first obstacle 3a and the crossing determiner 43c determines that a second vehicle (first container) is crossing, thereby reducing the risk of a collision with a second vehicle.

In the present embodiment, a second vehicle crosses from the right to the left in front of the vehicle 100, by way of example. However, the same applies when a second vehicle crosses from the left to the right in front of the vehicle 100. In this case, since a state in which the first detector 21c and the second detector 22c respectively detect the first obstacle 3a and the second obstacle 3b changes to a state in which the second detector 22c does not detect the second obstacle 3b, the fourth detector 24c detects the obstacle 3 in the left front of the vehicle 100.

Figure 12:
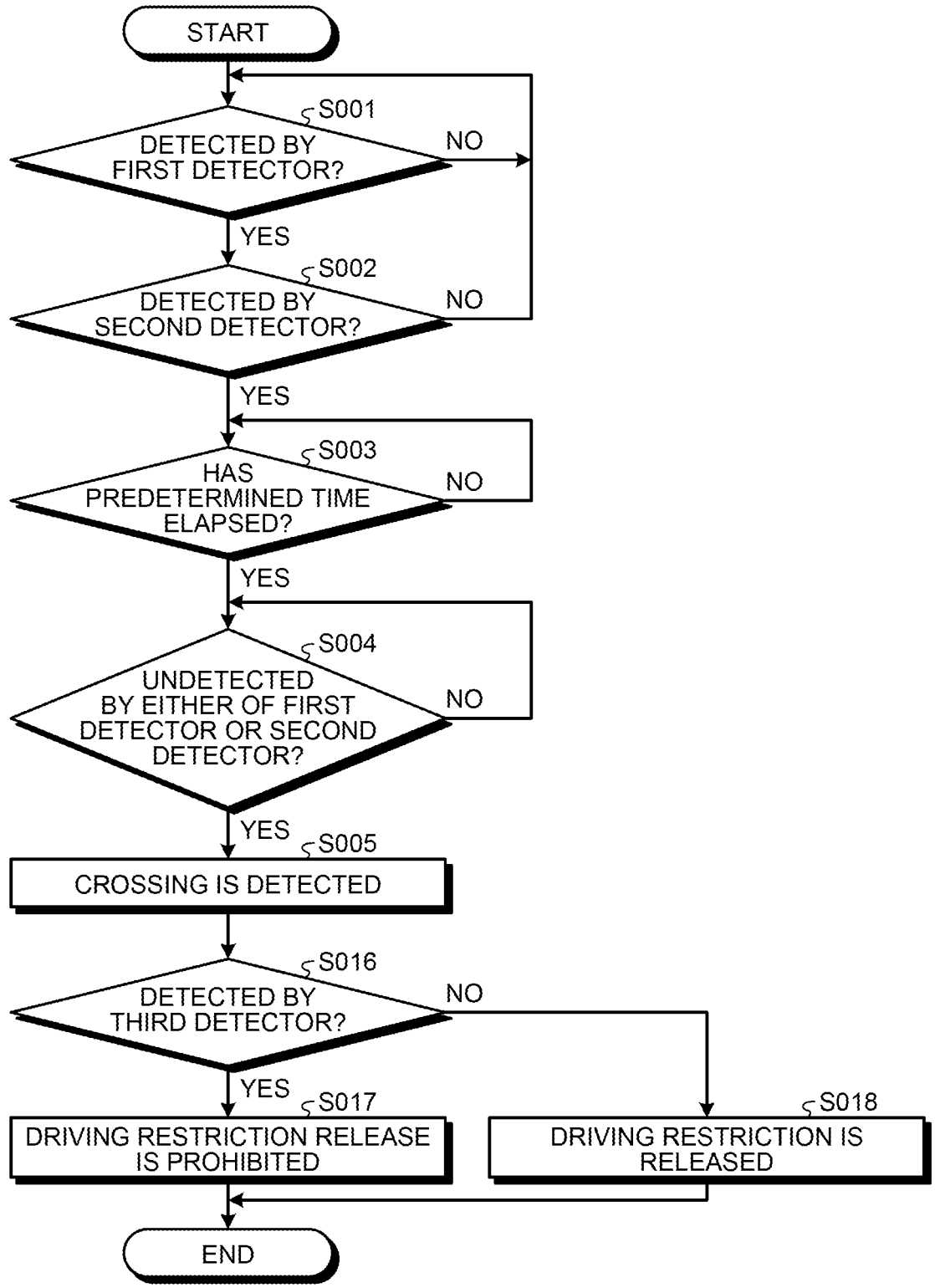
FIG. 12 is a flowchart illustrating the operation of the sonar control unit according to the fourth embodiment.

The operation of a sonar control unit 4c according to the present embodiment will be described using FIG. 12. FIG. 12 is a flowchart illustrating the operation of the sonar control unit 4c. Step S001 to step S005 are similar to those in the first embodiment and will not be further elaborated.

After step S005, it moves to step S016 in the flowchart. At step S016, the obstacle determiner 42c determines whether the obstacle 3 is detected by the third detector 23c. The determination result is sent to the restriction release determiner 44c. If the obstacle 3 is detected by the third detector 23c (Yes at step S016), the restriction release determiner 44a transmits information to the driving controller 51 to prohibit the release of the driving restriction control (step S017). The time point to determine whether the obstacle 3 is detected at step S016 is not limited to the moment when crossing is detected at step S005. The release of the driving restriction control is prohibited if the obstacle 3 is detected when a state in which the first detector 21c and the second detector 22c respectively detect the first obstacle 3a and the second obstacle 3b changes to a state in which the first detector 21c does not detect the first obstacle 3a, and the crossing determiner 43c determines crossing. It can be assumed that crossing is determined while at least one of the first detector 21c and the second detector 22c is detecting an obstacle. In other words, even after the obstacle 3 is not detected at a time point when crossing is determined and the driving restriction control is released, if the obstacle 3 is detected while an obstacle is being detected in front, the release of the driving restriction control is prohibited. With this control, even after crossing is determined and the vehicle starts moving forward, if an obstacle behind is detected, the driving restriction control is performed again to stop the vehicle 100, thereby preventing hitting against the vehicle ahead or the vehicle behind.

If the obstacle 3 is not detected by the third detector 23c (No at step S016), the restriction release determiner 44 transmits information to the driving controller 51 to release the driving restriction control (step S018). At step S017 and step S018, the flowchart ends. This is the end of description of the object detection device 1c according to the fourth embodiment.

In the present embodiment, the restriction release determiner 44 receives detection information of an obstacle different from a second vehicle determined to be crossing by the crossing determiner 43, as the vehicle surrounding condition, from the third detector 23c, and then determines whether to prohibit the driving restriction release. The object detection device 1c of the present embodiment therefore achieves effects similar to those of the first embodiment and can further reduce the risk of the vehicle hitting against the vehicle behind.

Fifth Embodiment

A fifth embodiment embodied as an object detection device 1d mounted on a moving object will be described below with reference to the drawings. The block diagram of the object detection device 1d according to the present embodiment is similar to FIG. 2 in the first embodiment and therefore omitted.

The object detection device 1d according to the present embodiment differs from the object detection device 1 according to the first embodiment in that driving restriction of restricting the movement of the vehicle 100 is released only when the vehicle 100 is stopped.

With such a configuration, movement restriction can be released reliably while the safety of the vehicle 100 is ensured. This configuration also enables the vehicle 100 to move forward to a line of other vehicles and signal other vehicles to merge.

Figure 13:
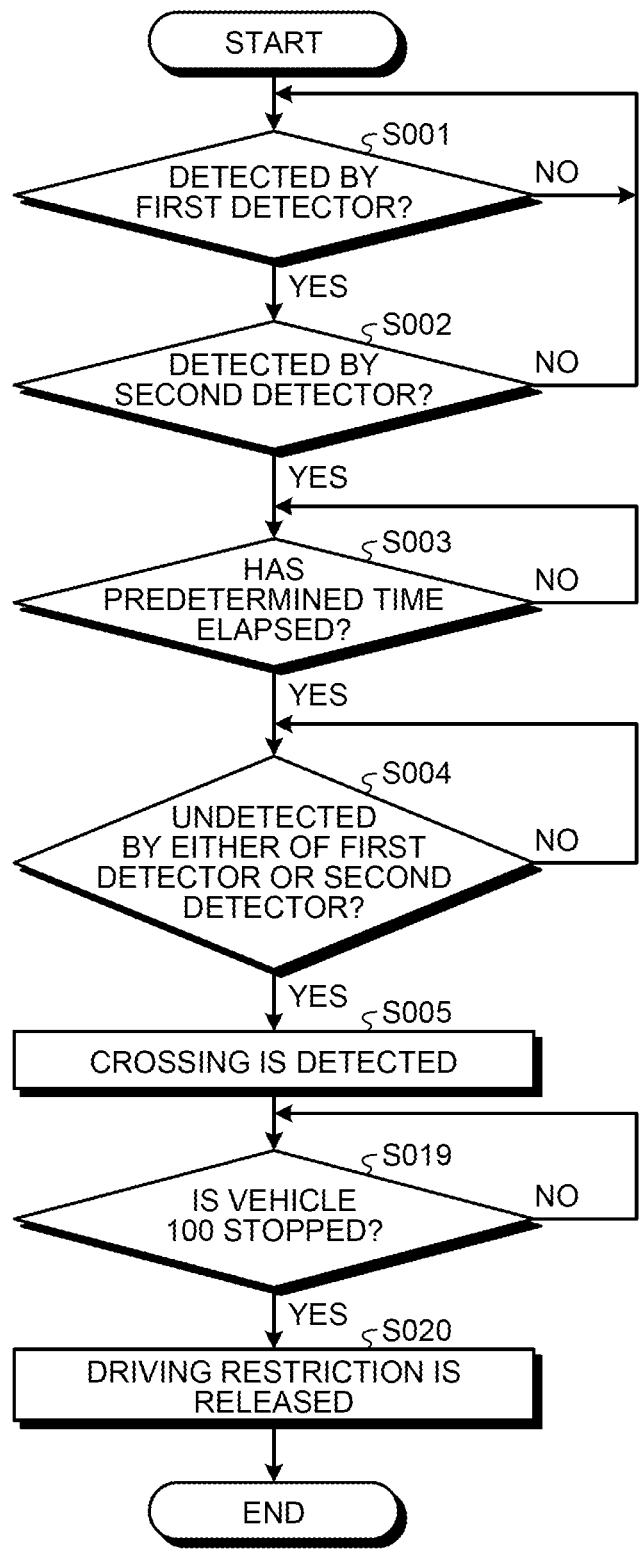
FIG. 13 is a flowchart illustrating the operation of the sonar control unit according to a fifth embodiment.

The operation of a sonar control unit 4d according to the present embodiment will be described using FIG. 13. FIG. 13 is a flowchart illustrating the operation of the sonar control unit 4d. Step S001 to step S005 are similar to those in the first embodiment and will not be further elaborated.

After step S005, it moves to step S019 in the flowchart. At step S019, a crossing determiner 43d obtains information indicating the moving state of the vehicle 100 from the driving controller 51. Specifically, information on whether the vehicle 100 is stopped is obtained. The crossing determiner 43d determines whether the vehicle 100 is stopped.

If the vehicle 100 is stopped (Yes at step S019), the driving restriction control of the vehicle 100 is released (step S020). In other words, the driving restriction control by acceleration suppression or braking control of the vehicle 100 is released. If the vehicle 100 is not stopped (No at step S019), it returns prior to step S019 in the flowchart. At step S020, the flowchart ends.

(Modification)

In the foregoing embodiment, the driving restriction of restricting the movement of the vehicle 100 is released only when the vehicle 100 is stopped. In the present modification, a restriction release determiner 44d prohibits the release of the driving restriction control until a predetermined time has elapsed after the vehicle 100 stops, as the driving status of the vehicle 100, in addition to the condition in the foregoing embodiment.

At the timing immediately after the vehicle 100 stops, it is uncertain whether the driver stops after checking if a second vehicle in front of the vehicle 100 is crossing. The restriction release determiner 44d therefore prohibits the release of the driving restriction control until a predetermined time has elapsed after the vehicle 100 stops. This configuration also enables the driver to signal other vehicles to merge while slowly approaching a line of other vehicles crossing in front of the vehicle 100. The predetermined time is, for example, one second.

Sixth Embodiment

A sixth embodiment embodied as an object detection device 1e mounted on a moving object will be described below with reference to the drawings. The block diagram of the object detection device 1e according to the present embodiment is similar to FIG. 2 in the first embodiment and therefore omitted.

The object detection device 1e according to the present embodiment differs from the object detection device 1d according to the fifth embodiment in the condition by which the driving restriction release is prohibited. More specifically, a restriction release determiner 44e prohibits the release of the driving restriction control of the vehicle 100 under a certain condition even when a crossing determiner 43e determines crossing of a second vehicle and the vehicle 100 is stopped. A specific condition will be detailed with reference to the flowchart.

Figure 14:
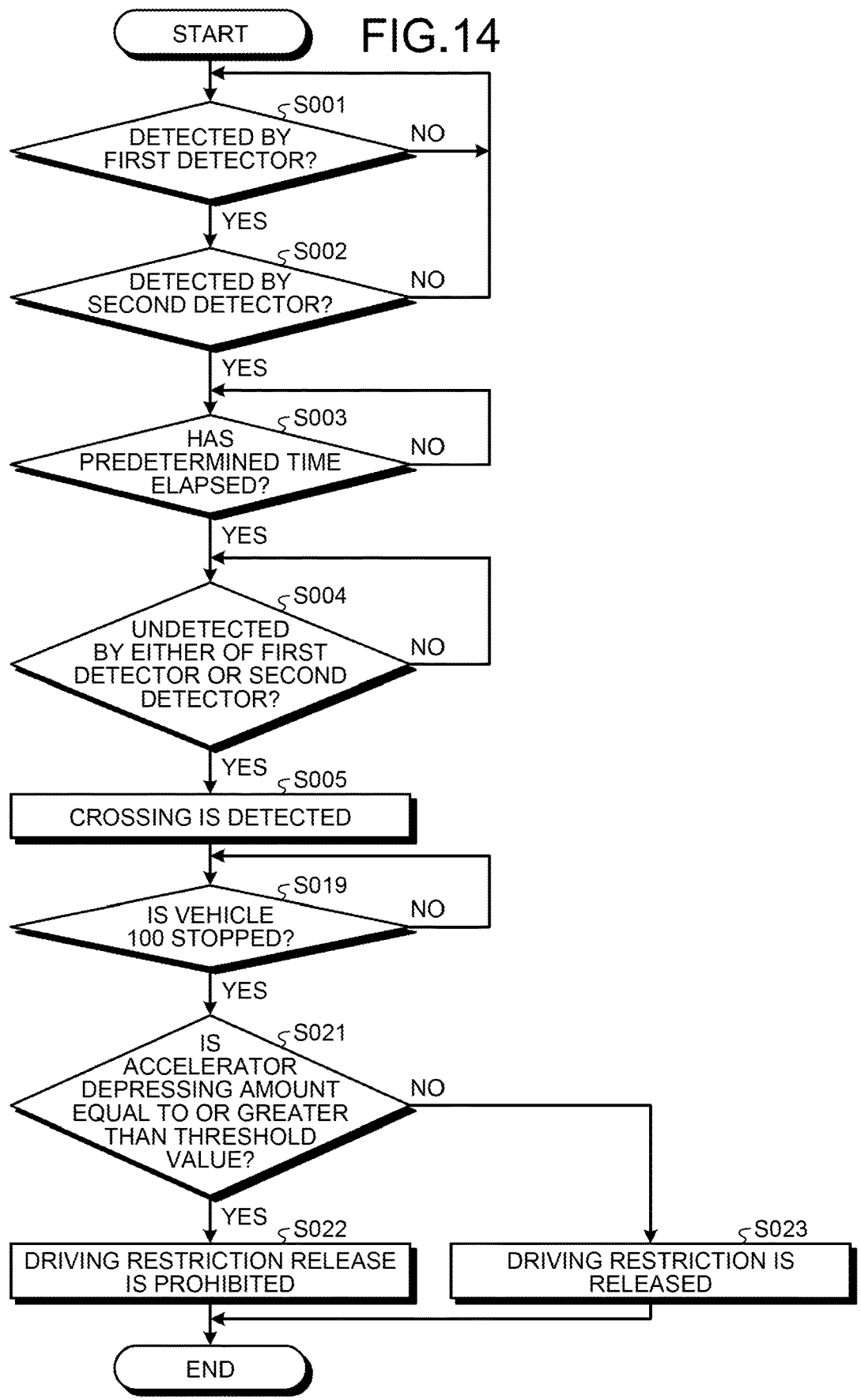
FIG. 14 is a flowchart illustrating the operation of the sonar control unit according to a sixth embodiment.

The operation of a sonar control unit 4e according to the present embodiment will be described using FIG. 14. FIG. 14 is a flowchart illustrating the operation of the sonar control unit 4e. Step S001 to step S005 and step S019 are similar to those in the fifth embodiment and will not be further elaborated. If the vehicle 100 is stopped (Yes at step S019), it moves to step S021 in the flowchart.

At step S021, driver's operation information of the accelerator pedal 61 of the vehicle 100 is obtained from the driving controller 51. Specifically, information on the amount of depressing the accelerator pedal 61 is obtained. Here, if the amount of depressing the accelerator pedal 61 is equal to or greater than a threshold value (Yes at step S021), the restriction release determiner 44e prohibits the release of the driving restriction control (step S022) even when the crossing determiner 43e detects crossing of a second vehicle and the vehicle 100 is stopped.

If the amount of depressing the accelerator pedal 61 is less than a threshold value (No at step S021), the restriction release determiner 44e transmits information to the driving controller 51 to release the driving restriction control (step S023). At step S022 and step S023, the flowchart ends.

In the present embodiment, even when the crossing determiner 43e detects crossing of a second vehicle and the vehicle 100 is stopped, the restriction release determiner 44e obtains information on the amount of depressing the accelerator pedal 61 as the driving status of the vehicle 100 and then determines whether to prohibit the release of the driving restriction control. The object detection device 1e of the present embodiment therefore achieves effects similar to those of the first embodiment and can further reduce the risk of hitting against a second vehicle when the driver depresses the accelerator pedal strongly.

Seventh Embodiment

A seventh embodiment embodied as an object detection device 1f mounted on a moving object will be described below with reference to the drawings. The block diagram of the object detection device 1f according to the present embodiment is similar to FIG. 2 in the first embodiment and therefore omitted.

The object detection device 1f according to the present embodiment differs from the object detection device 1d according to the fifth embodiment in the condition by which the driving restriction release is prohibited. More specifically, a restriction release determiner 44f prohibits the release of the driving restriction control of the vehicle 100 under a certain condition even when a crossing determiner 43f determines crossing of a second vehicle and the vehicle 100 is stopped. A specific condition will be detailed with reference to the flowchart.

Figure 15:
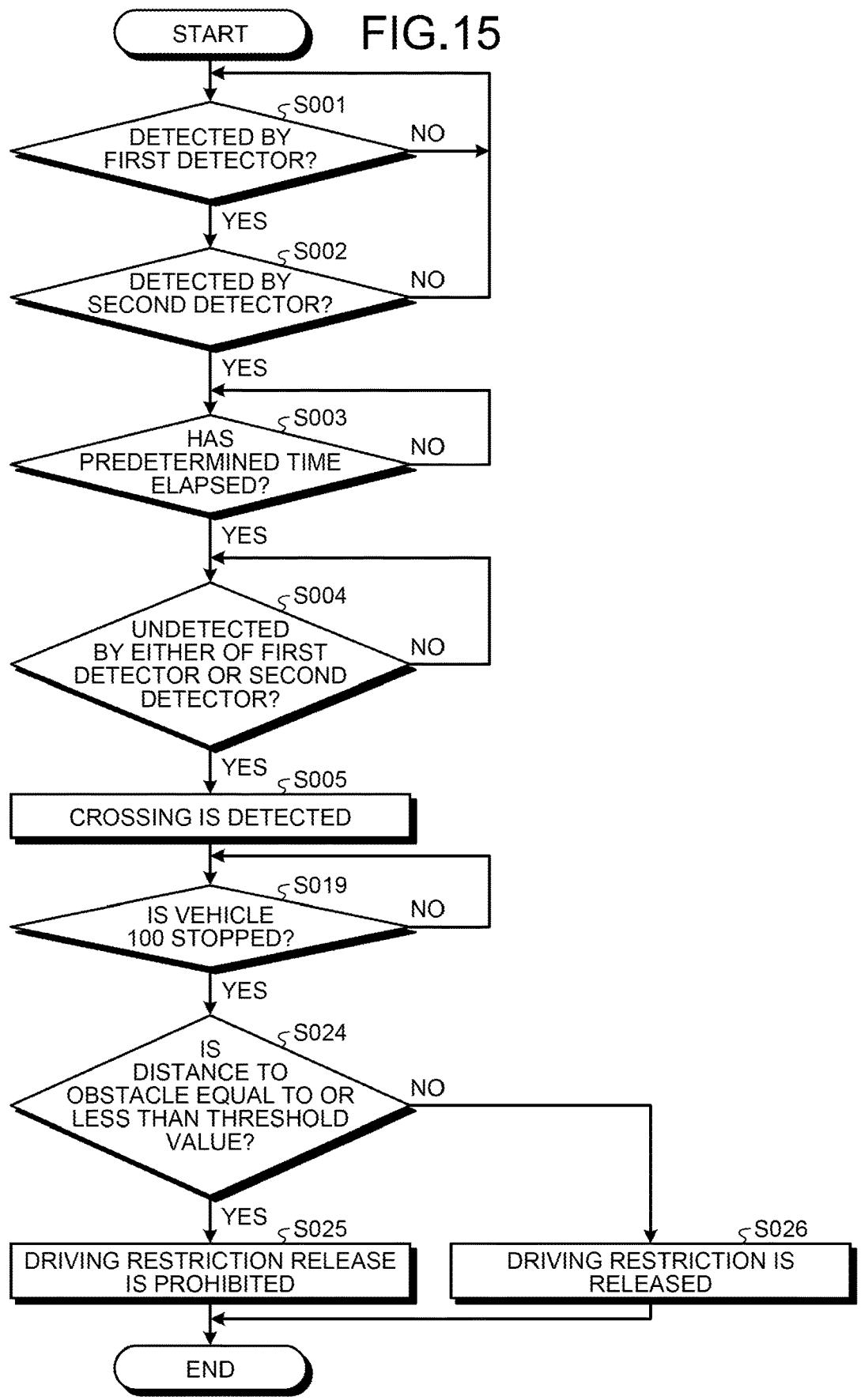
FIG. 15 is a flowchart illustrating the operation of the sonar control unit according to a seventh embodiment.

The operation of the sonar control unit 4e according to the present embodiment will be described using FIG. 15. FIG. 15 is a flowchart illustrating the operation of a sonar control unit 4f. Step S001 to step S005 and step S019 are similar to those in the fifth embodiment and will not be further elaborated. If the vehicle 100 is stopped (Yes at step S019), it moves to step S024 in the flowchart.

At step S024, distance information from the vehicle 100 to the obstacle is obtained from a distance calculator 41f. Here, if the distance from the vehicle 100 to the obstacle is equal to or less than a threshold value (Yes at step S024), the restriction release determiner 44f prohibits the release of the driving restriction control (step S025) even when the crossing determiner 43f detects crossing of a second vehicle and the vehicle 100 is stopped.

If the distance from the vehicle 100 to the obstacle is greater than a threshold value (No at step S021), the restriction release determiner 44e transmits information to the driving controller 51 to release the driving restriction control (step S026). At step S025 and step S026, the flowchart ends. The threshold for the distance from the vehicle 100 to the obstacle is, for example, 30 cm. Since a obstacle sensor 2f is influenced by the reverberation of the ultrasonic wave transmitted by the obstacle sensor 2f itself, if the distance between the vehicle 100 and the obstacle 3 is too short, the obstacle sensor 2f fails to distinguish between a signal caused by the reverberation of the ultrasonic wave transmitted or a signal reflected by the obstacle 3 and fails to detect the obstacle 3. The threshold for the distance from the vehicle 100 to the obstacle is therefore set to a minimum distance that enables a distinction between a signal caused by the reverberation of the ultrasonic wave transmitted or a signal reflected by the obstacle 3.

In the present embodiment, even when the crossing determiner 43f detects crossing of a second vehicle and the vehicle 100 is stopped, the restriction release determiner 44f obtains information on the distance from the vehicle 100 to the obstacle 3 as the surrounding condition of the vehicle 100 and then determines whether to prohibit the release of the driving restriction control. The object detection device if of the present embodiment therefore achieves effects similar to those of the first embodiment and can further reduce the risk of hitting against a second vehicle even when the distance from the vehicle 100 to a second vehicle is short. Each of the fifth to seventh embodiments may be combined with the fourth embodiment. In a combination with the fourth embodiment, even when the crossing determiner 43d (43e, 43f) determines crossing of a second vehicle, the restriction release determiner 44f may prohibit the release of the driving restriction control if an object is detected by two or more (a plurality of) detectors among at least three detectors. This configuration can reduce the risk of a collision of the vehicle 100 with the obstacle 3 when the probability that the obstacle 3 other than a second vehicle is present is high.

Eighth Embodiment

An eighth embodiment embodied as an object detection device 1g mounted on a moving object will be described below with reference to the drawings.

Figure 16:
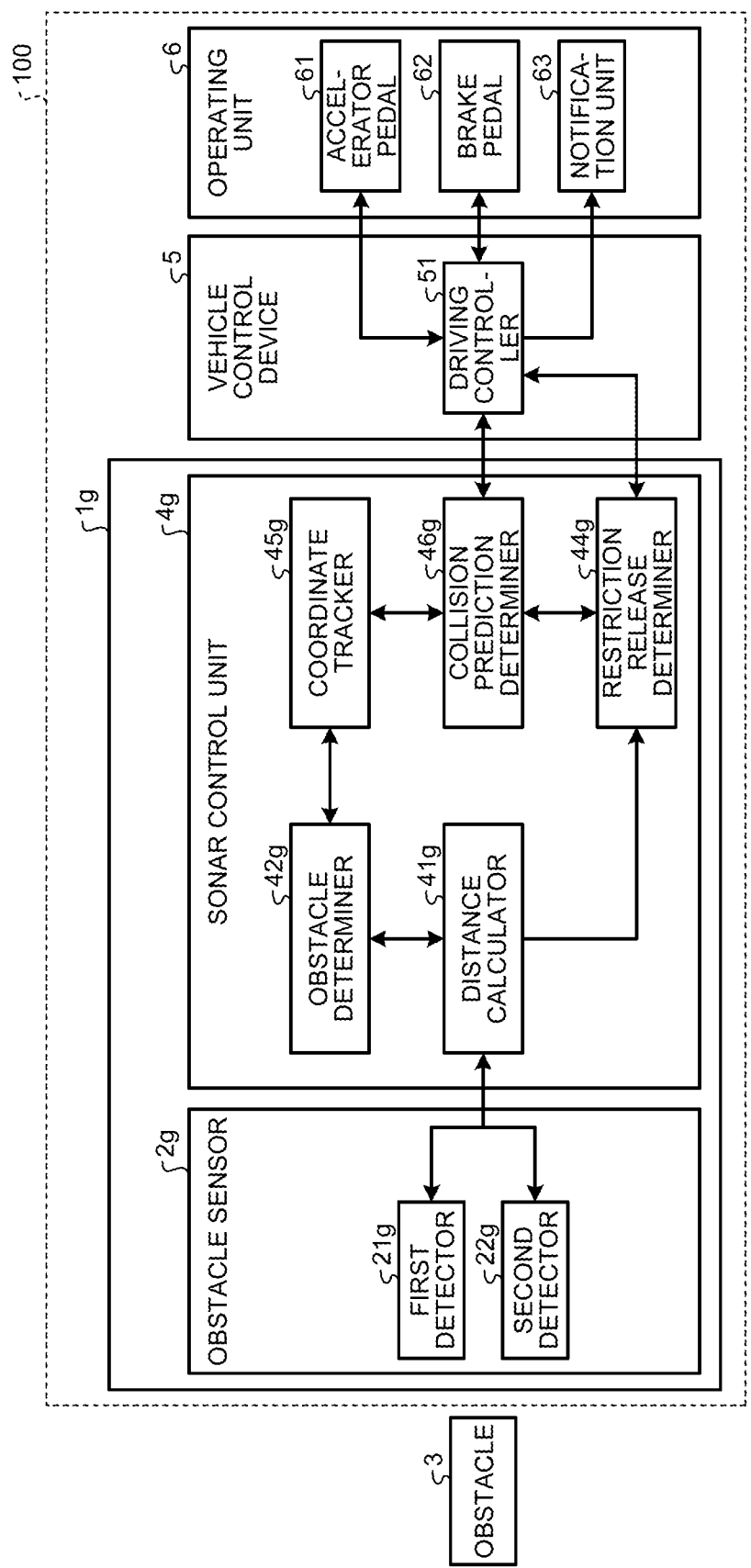
FIG. 16 is an exemplary functional block diagram of the object detection device according to an eighth embodiment.

FIG. 16 is a block diagram of the object detection device 1g according to the present embodiment. The object detection device 1g according to the present embodiment differs from the object detection device 1 according to the first embodiment in that a sonar control unit 4g does not include a crossing determiner but instead includes a coordinate tracker 45g and a collision prediction determiner 46g. The object detection device 1g in the present embodiment may include a second detector 22g, which is not essential. The object detection device 1g may also include a crossing determiner (not illustrated), which is not essential.

The coordinate tracker 45g calculates an expected trajectory of a second vehicle that is the obstacle 3 crossing the moving direction of the vehicle 100, based on the object detection result by a first detector 21g. Based on the detection result of the first obstacle 3a by the first detector 21g, the distance calculator 41 calculates the distance between the vehicle 100 and a second vehicle.

Based on the calculated distance information, an expected trajectory (expected position) of a second vehicle can be calculated. The collision prediction determiner 46g determines the possibility of a collision between the vehicle 100 that is the own vehicle and a second vehicle, based on the expected trajectory calculated by the coordinate tracker 45g.

It is preferable that the object detection device 1g further includes the second detector 22g at a position different from the first detector 21g. The coordinate tracker 45g calculates an expected trajectory of a second vehicle that is the obstacle 3 crossing the moving direction of the vehicle 100, based on the object detection result based on the detection result of the first obstacle 3a by the first detector 21g and the detection result of second obstacle 3b by the second detector 22g.

Since the second detector 22g is provided at a position different from the first detector 21g and the detection results of two obstacle sensors 2g are used, more accurate position information of a second vehicle can be obtained. The second detector 22g is not limited to an indirect detection sensor and may be a direct detection sensor. With a direction detection sensor, the collision prediction determiner 46g can determine the possibility of a collision even with an object whose coordinates are not available.

In the first embodiment, when the object detection device 1 detects crossing of a second vehicle at the rear end of a second vehicle, the crossing determiner 43 determines crossing of a second vehicle if the first detector 21 does not detect the first obstacle 3a.

However, the bumper provided on the rear end of a second vehicle usually has a rounded form, and a reflected wave of an ultrasonic wave transmitted by the obstacle sensor 2 of the object detection device 1 may be received by the obstacle sensor 2 even after a second vehicle has passed by in front of the own vehicle. In other words, depending on the timing of transmitting and receiving ultrasonic waves by the obstacle sensor 2, the driving controller 51 may fail to release the driving restriction control of the vehicle 100 at the desired timing.

In addition, in the object detection device 1, since the ultrasonic waves transmitted by the obstacle sensor 2 are susceptible to disturbance such as wind and weather, the risk of a collision with a second vehicle arises if the vehicle 100 suddenly accelerates immediately when the crossing determiner 43 determines crossing of a second vehicle (when from a state in which the first detector 21 and the second detector 22 respectively detect the first obstacle 3a and the second obstacle 3b, a state in which it is undetected by the obstacle sensor 2 of either the first detector 21 or the second detector 22 is reached).

In the present embodiment, therefore, the coordinate tracker 45g creates an expected trajectory of a second vehicle, and the collision prediction determiner 46g determines the possibility of a collision between the vehicle 100 and a second vehicle based on the expected trajectory to detect crossing of a second vehicle more accurately. In other words, the past position (coordinate) information of a second vehicle is detected in chronological order so that the future trajectory of a second vehicle is predicted and the possibility of a collision is evaluated. The specific operation of the sonar control unit 4g will be detailed with reference to the flowchart.

Figure 17:
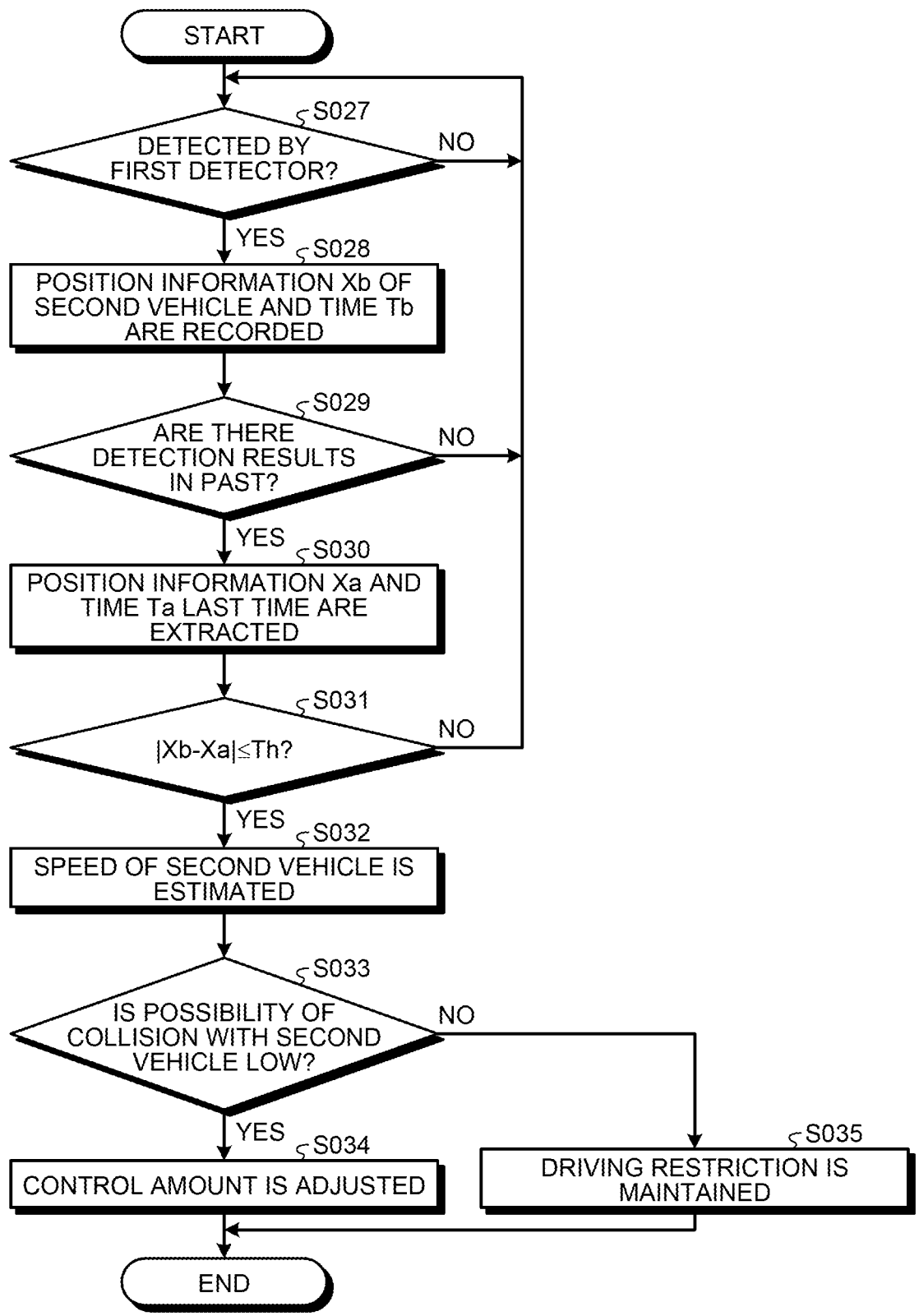
FIG. 17 is a flowchart illustrating the operation of the sonar control unit according to the eighth embodiment.

The operation of the sonar control unit 4g according to the present embodiment will be described using FIG. 17. FIG. 17 is a flowchart illustrating the operation of the sonar control unit 4g. The flowchart illustrated in FIG. 17 is started when the ignition of the vehicle 100 is turned on, and is performed each time the obstacle sensor 2 transmits an ultrasonic wave. First, at step S027, a obstacle determiner 42g determines whether the obstacle 3 is detected, based on a received wave signal from the first detector 21g.

If the obstacle determiner 42g determines that obstacle 3 is detected (Yes at step S027), the process moves to step S028. If the obstacle determiner 42 determines that the obstacle 3 is undetected (No at step S027), the process returns prior to step S027. If the obstacle determiner 42g detects the obstacle 3, a distance calculator 41g calculates the distance to the obstacle 3.

At step S028, the coordinate tracker 45g records or stores position information Xb of a second vehicle based on the object detection result by the first detector 21g. The time Tb of recording is also recorded (stored). The position information is, for example, the position coordinates of a second vehicle. Subsequently, it moves to step S029 in the flowchart.

At step S029, the coordinate tracker 45g checks whether there are detection results recorded in the past. If there are detection results recorded in the past (Yes at step S029), the latest (last detected) position information Xa of a second vehicle and the recording time Ta are extracted from the detection results recorded (stored) in the past (step S030). Subsequently, it moves to step S031 in the flowchart. If there are not detection results recorded (stored) in the past (No at step S029), the process returns prior to step S027.

Next, at step S031, the coordinate tracker 45g determines whether the difference between the position information Xb of a second vehicle recorded this time and the position information Xa of a second vehicle recorded last time is equal to or less than a threshold value. The process here is to determine whether a second vehicle with position information recorded this time is the same object as a second vehicle with position information recorded last time. The difference between Xb and Xa (|Xb−Xa|) represents the amount of movement of a second vehicle. The reason for performing such a process is that if the amount of movement (|Xb−Xa|) is too large, it is likely that a different object is being detected.

If the difference between Xb and Xa (|Xb−Xa|) is equal to or less than a threshold value (Th) (Yes at step S031), it moves to step S032 in the flowchart. If the difference between Xb and Xa (|Xb−Xa|) is greater than a threshold value (Th) (No at step S031), it returns prior to step S027 in the flowchart.

At step S032, the coordinate tracker 45g estimates the speed of a second vehicle. Specifically, the speed of a second vehicle is obtained by differential calculation of the position coordinates of a second vehicle with respect to time. In other words, the coordinate tracker 45g estimates the speed of a second vehicle by dividing the amount of movement (|Xb−Xa|) by the time change (Tb−Ta). The coordinate tracker 45g can also estimate the acceleration of a second vehicle by the change in estimated speed over time. The estimated acceleration of a second vehicle can be used to determine the possibility of a collision between the vehicle 100 and a second vehicle as described below. The coordinate tracker 45g calculates the expected trajectory of a second vehicle based on the detected position information of a second vehicle. It moves to step S033 in the flowchart.

At step S033, the collision prediction determiner 46g determines the possibility of a collision between the vehicle 100 and a second vehicle based on the expected trajectory calculated by the coordinate tracker 45g. Specifically, the collision prediction determiner 46g determines the possibility of a collision, using the speed of a second vehicle estimated by the coordinate tracker 45g at step S031, the distance from the vehicle 100 to a second vehicle calculated by the distance calculator 41g, and the speed of the vehicle 100 obtained from the vehicle control device 5.

If the collision prediction determiner 46g determines that the possibility of a collision between the vehicle 100 and a second vehicle is low (Yes at step S033), the restriction release determiner 44 transmits information to the driving controller 51 to adjust the control amount of driving restriction of the vehicle 100 (step S034). The driving controller 51 adjusts the control amount of driving restriction control of the vehicle 100. The control amount of driving restriction is, for example, a specific control amount for performing acceleration suppression or braking control of the vehicle 100. Reducing the control amount can reduce the possibility that the vehicle 100 collides with a second vehicle. The driving restriction of the vehicle 100 may be released (the control amount of driving restriction is set to zero) when it is determined that the possibility of a collision between the vehicle 100 and a second vehicle is low.

If the collision prediction determiner 46g does not determine that the possibility of a collision between the vehicle 100 and a second vehicle is low (No at step S033), a restriction release determiner 44g transmits information to the driving controller 51 to maintain driving restriction control without adjusting the control amount of driving restriction (step S035). At step S034 and step S035, the flowchart ends.

For example, the collision prediction determiner 46g determines that the possibility of a collision between the vehicle 100 and a second vehicle is low when the expected trajectory of a second vehicle calculated by the coordinate tracker 45g does not intersect the moving direction of the vehicle 100 at the same time. Alternatively, the collision prediction determiner 46g may calculate the arrival time taken for the vehicle 100 to reach the position of a second vehicle, based on the distance information from the vehicle 100 to a second vehicle calculated by the distance calculator 41g and the speed information of the vehicle 100 obtained from the vehicle control device 5, and may determine that the possibility of a collision between the vehicle 100 and a second vehicle is low if a second vehicle crossing is not present within the moving range of the vehicle 100 until the arrival time. Information on the moving direction of the vehicle 100 and a second vehicle may be obtained from map information and used to determine the possibility of a collision. Acceleration information of the vehicle 100 may be obtained from the vehicle control device 5 and used to determine the possibility of a collision between the vehicle 100 and a second vehicle.

The object detection device 1g in the present embodiment can determine whether to release the driving restriction of the vehicle 100 after the collision prediction determiner 46g determines the possibility of a collision between the vehicle 100 and a second vehicle based on the expected trajectory of a second vehicle calculated by the coordinate tracker 45g. The object detection device 1g of the present embodiment therefore achieves effects similar to those of the first embodiment and in addition can release the driving restriction control of the vehicle 100 at the desired timing.

In the above description, the object detection device 1g includes the coordinate tracker 45g and the collision prediction determiner 46g. However, the present embodiment is not limited thereto. The vehicle control device 5 may include one or both of the coordinate tracker 45g and the collision prediction determiner 46g.

Ninth Embodiment

A ninth embodiment embodied as an object detection device 1h mounted on a moving object will be described below with reference to the drawings.

The block diagram of the object detection device 1h according to the present embodiment is similar to FIG. 2 in the first embodiment and therefore omitted. The principle of detecting the position of the obstacle 3 is also similar and therefore omitted.

The object detection device 1h according to the present embodiment differs from the object detection device 1 according to the first embodiment in a method by which a crossing determiner 43h determines "crossing" of the obstacle 3. In the first embodiment, as illustrated in FIG. 5, the crossing determiner 43 determines crossing of a second vehicle, at the rear end of a second vehicle that is the obstacle 3. To be more specific, the crossing determiner 43 determines crossing of a second vehicle when a state in which both of the first detector 21 and the second detector 22 are in the detection state shifts to a state in which the first detector 21 is the non-detection state and the second detector 22 is in the detection state.

However, in the above determination, since the first detector 21 and the second detector 22 detect the rear end of a second vehicle, the crossing determiner 43 delays determining crossing and makes a crossing determination substantially after the vehicle has passed by. Whether a second vehicle detected at present is crossing is therefore unable to be detected in real time.

Figure 18:
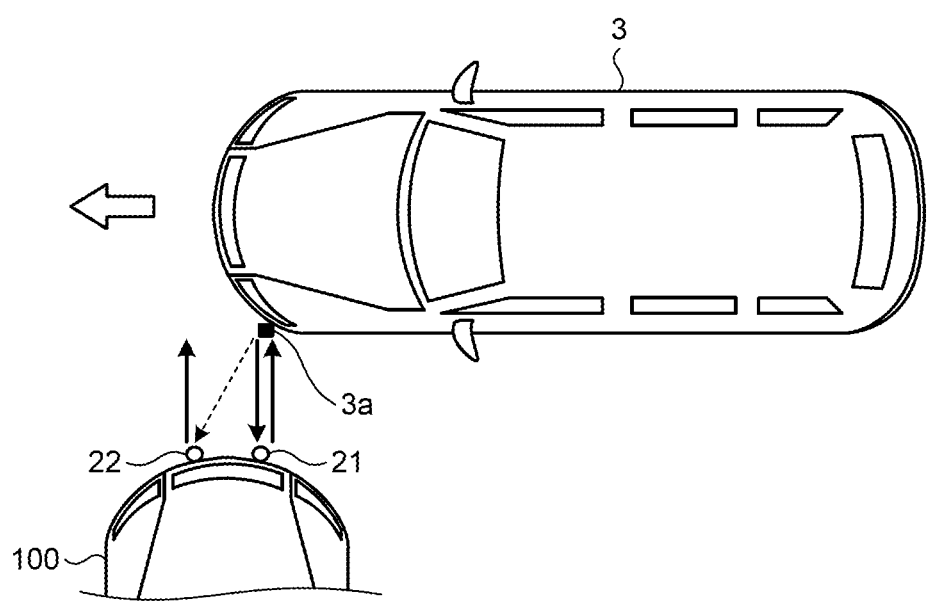
FIG. 18 is a diagram illustrating an object detection state when a crossing determination is performed at a front end of a second vehicle.

In the object detection device 1h according to the present embodiment, therefore, as illustrated in FIG. 18, the crossing determiner 43 determines crossing of a second vehicle at the front end of a second vehicle that is the obstacle 3. To be more specific, the crossing determiner 43h determines crossing of a second vehicle when a state in which an object is detected by a first detector 21h and the second detector 22h is in the object non-detection state shifts to a state in which both of the first detector 21h and the second detector 22h are in the detection state.

The object detection device 1h in the present embodiment can detect crossing a second vehicle at an earlier timing than when a crossing determination is made at the rear end of a second vehicle, because the crossing determiner 43h determines crossing of a second vehicle at the front end of a second vehicle, as in the determination described above.

Since crossing of a second vehicle is detected at a relatively early timing, driving assistance as intended by the driver can be implemented without excessively controlling the driving restriction of the vehicle 100. In FIG. 18, a second vehicle moves from the right to the left in front of the vehicle 100, by way of example. However, the same applies when a second vehicle moves from the left to the right in front of the vehicle 100. In this case, an obstacle sensor 2h installed at the left front of the vehicle 100 should read as the first detector 21h, and the obstacle sensor 2h installed at the right front of the vehicle 100 should read as the second detector 22h.

Needless to say, the object detection device 1h in the present embodiment can be applied similarly to the vehicle 100 moving backward. In this case, the first detector 21h and the second detector 22h provided at the back of the vehicle 100 detect crossing of a second vehicle.

In the object detection device 1h, the obstacle sensor 2h may further include two detectors at the front of the vehicle 100. The two detectors added are, for example, corner sensors. The obstacle sensor 2h composed of four detectors can improve the accuracy of crossing determination.

When the obstacle sensor 2h is composed of four detectors, the obstacle sensor 2h installed at the rightmost side at the front of the vehicle 100 is defined as the first detector 21h, the obstacle sensor 2h disposed at the second rightmost side at the front of the vehicle 100 is defined as the second detector 22h, and the first detector 21h and the second detector 22h are used to detect crossing of a second vehicle, whereby crossing of a second vehicle can be detected at an even earlier timing.

In this case, the first detector 21h and the second detector 22h are installed at the front of the vehicle 100 on the right side of the center of the vehicle 100. When a second vehicle moves from the left to the right in front of the vehicle 100, the obstacle sensor 2h installed at the front of the vehicle 100 to the left side of the center of the vehicle 100 can be used as the first detector 21h and the second detector 22h to detect crossing of a second vehicle.

Figure 19:
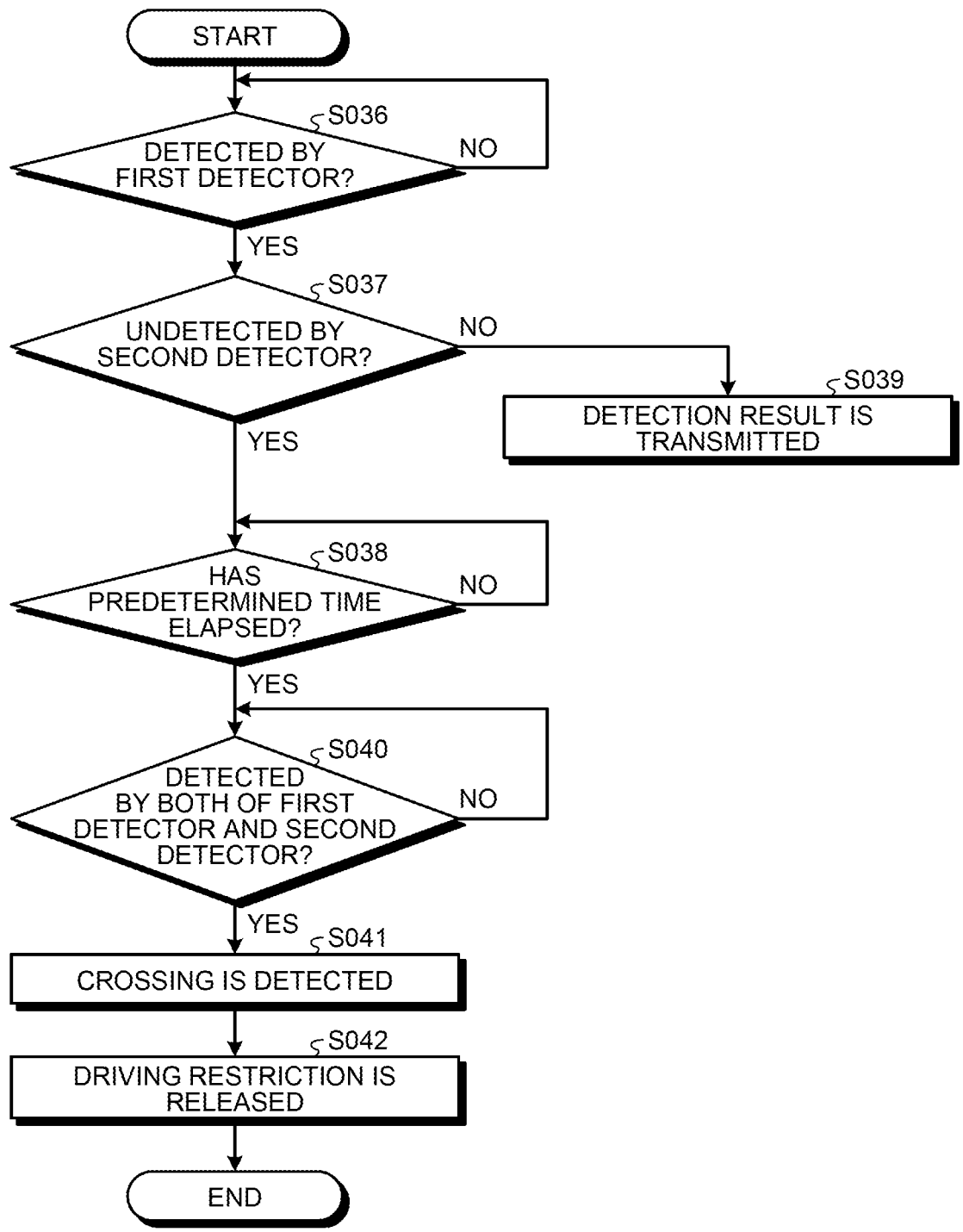
FIG. 19 is a flowchart illustrating the operation of the sonar control unit according to a ninth embodiment.

The operation of a sonar control unit 4h according to the present embodiment will be described using FIG. 19. First, at step S036, an obstacle determiner 42h determines whether the first obstacle 3a is detected, based on a received wave signal from the first detector 21h. If the obstacle determiner 42h determines detection (Yes at step S036), the process moves to step S037. If the obstacle determiner 42h determines that the first obstacle 3a is undetected (No at step S036), the process returns prior to step S036.

Subsequently, at step S037, the obstacle determiner 42 determines whether the second obstacle 3b is detected, based on a received wave signal from the second detector 22h. If the obstacle determiner 42h determines that the second obstacle 3b is undetected (Yes at step S037), the process moves to step S038.

If the obstacle determiner 42h determines that the second obstacle 3b is detected (No at step S037), the obstacle determiner 42h transmits a signal to the driving controller 51 to indicate that the first detector 21h and second detector 22h detect the first obstacle 3a and the second obstacle 3b (step S039). A distance calculator 41h calculates the distance to the obstacle 3, based on received wave signals from the first detector 21h and the second detector 22h.

Step S036 and step S037 are in no particular order. The obstacle determiner 42h may detect the first obstacle 3a based on a received wave signal from the first detector 21h, after determining whether the second obstacle 3b is present based on a received wave signal from the second detector 22h. The obstacle determiner 42h may simultaneously determine detection of the first obstacle 3a and the second obstacle 3b.

At step S038, a timer in the sonar control unit 4h measures whether a predetermined time (for example, three seconds) has elapsed. If a predetermined time has elapsed (Yes at step S038), the process moves to step S040. If a predetermined time has not elapsed (No at step S038), the process returns prior to step S038. The step at which the timer determines whether a certain period has elapsed is not essential in the present embodiment.

At step S040, if the obstacle determiner 42h determines that both of the first obstacle 3a and the second obstacle 3b are detected, based on received wave signals from the first detector 21h and the second detector 22h (Yes at step S040), the process moves to step S041.

If the obstacle determiner 42h determines that either the first obstacle 3a or the second obstacle 3b is undetected (No at step S040), the process returns prior to step S040.

At step S041, the crossing determiner 43h receiving obstacle information as a signal from the obstacle determiner 42h and the distance calculator 41h determines that crossing of a second vehicle that is the obstacle 3 has occurred. If the crossing determiner 43h determines crossing of a second vehicle, the crossing determiner 43h transmits the crossing determination information as a signal to the driving controller 51 in the vehicle control device 5. Upon obtaining the crossing determination information of a second vehicle from the crossing determiner 43h, the driving controller 51 releases the driving restriction control of the vehicle 100 (step S042). At step S042, the flowchart ends.

In the flowchart describe above, the steps from step S028 to step S035 described in the operation of the sonar control unit 4g of the object detection device 1g according to the eighth embodiment may be added after step S041. The object detection device 1h includes a coordinate tracker 45h and a collision prediction determiner 46h and the above steps are added, whereby the object detection device 1h can determine whether to release the driving restriction of the vehicle 100 after the collision prediction determiner 46h determines the possibility of a collision between the vehicle 100 and a second vehicle based on the expected trajectory of a second vehicle calculated by the coordinate tracker 45h. Accordingly, the driving restriction control of the vehicle 100 can be released at the desired timing.

In the object detection device 1h according to the present embodiment, the crossing determiner 43 determines crossing of a second vehicle at the front end of a second vehicle that is the obstacle 3 (crossing is determined when a state in which an object is detected by the first detector 21h and the second detector 22h is in the object non-detection state shifts to a state in which both of the first detector 21h and the second detector 22h are in the detection state). The object detection device 1h of the present embodiment therefore achieves effects similar to those of the first embodiment and in addition can detect crossing of a second vehicle at an earlier timing than when crossing is determined at the rear end of a second vehicle. In addition, since crossing of a second vehicle is detected at a relatively early timing, the object detection device 1h of the present embodiment can easily adjust the braking timing, the driving force suppression amount, and the conditions for releasing a crossing state.

Tenth Embodiment

A tenth embodiment embodied as an object detection device 1 mounted on a moving object will be described below with reference to the drawings. The block diagram of the object detection device 1 according to the present embodiment is similar to FIG. 2 used to describe the first embodiment and thus a description of each component will be omitted. The object detection device 1 according to the present embodiment differs from the object detection device 1 according to the first embodiment in the condition by which the restriction release determiner 44 prohibits the release of the driving restriction control. For example, a predetermined condition for prohibiting the release of the driving restriction control in the present embodiment is a condition related to pluralism of objects.

Figure 20:
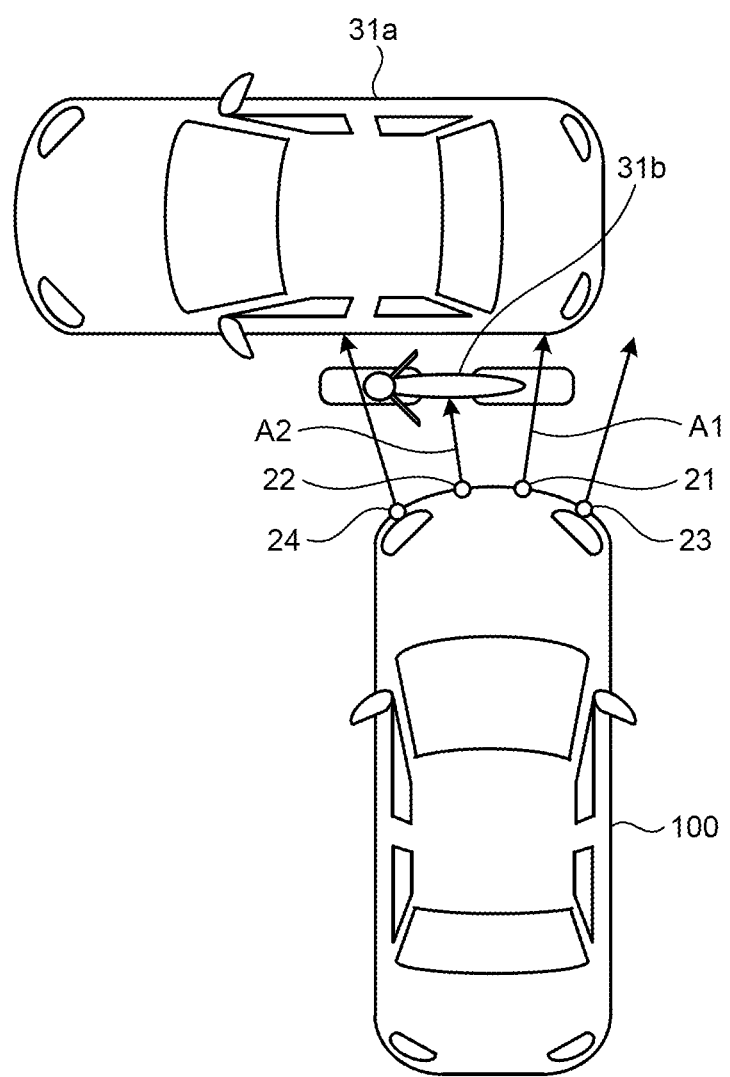
FIG. 20 is a diagram illustrating an object detection state when other vehicles include a two-wheel vehicle according to a tenth embodiment.

FIG. 20 is a diagram illustrating an object detection state when other vehicles include a two-wheel vehicle according to the present embodiment. The vehicle 100 illustrated in FIG. 20 has a first detector 21, a second detector 22, a third detector 23, and a fourth detector 24, but the vehicle 100 has at least the first detector 21 and the second detector 22. The present embodiment can be applied to handle a case where the obstacle detected by a plurality of detectors is not a single vehicle but a plurality of objects such as a four-wheel vehicle 31a and a two-wheel vehicle 31b, as illustrated in FIG. 20. In the present embodiment, the term vehicle generally refers to not only the four-wheel vehicle 31a but also the two-wheel vehicle 31b. The two-wheel vehicle 31b may be a motorcycle or may be a bicycle or the like. Compared with the four-wheel vehicle 31a, the two-wheel vehicle 31b may be difficult to reflect an ultrasonic wave or the strength of the reflection may vary among parts.

Specifically, when the two-wheel vehicle 31b is in front of the object detection device 1, an ultrasonic wave striking on the main part of the body of the two-wheel vehicle 31b, especially the engine part, is reflected, but an ultrasonic wave striking on the spoke of the wheel is transmitted, so that the two-wheel vehicle 31b is sometimes partially not detected as an obstacle. Furthermore, with ultrasonic waves, it is sometimes difficult to grasp the shape of the two-wheel vehicle 31b as an obstacle, and therefore, when the four-wheel vehicle 31a is in front of the vehicle 100 and the two-wheel vehicle 31b is in front of the four-wheel vehicle 31a, the detection of the four-wheel vehicle 31a and the detection of the two-wheel vehicle 31b in front may be indistinctive, and the obstacle determiner 42 may fail to identify the four-wheel vehicle 31a and the two-wheel vehicle 31b as separate obstacles. In this case, even when the four-wheel vehicle 31a moves in front of the own vehicle 100 and it is determined that crossing has occurred, the two-wheel vehicle 31b does not always move at the same time. The release of braking therefore must be prohibited in order to avoid a collision of the vehicle 100 with the two-wheel vehicle 31b. In other words, the condition required to ensure safety even when it is determined that crossing has occurred and braking is released is that the object in front of the own vehicle 100 is a single, so when there is a suspicion that a plurality of objects are present in front of the vehicle 100, the release of braking must be prohibited. Hereafter, this condition for prohibiting the release of braking will be referred to as the condition related to pluralism of objects. Specifically, even when the crossing determiner 43 determines crossing of a second vehicle (for example, when from a state in which the first detector 21 and the second detector 22 respectively detect the first obstacle 3a and the second obstacle 3b, a state in which it is undetected by the obstacle sensor 2 of either the first detector 21 or the second detector 22 is reached), the restriction release determiner 44 determines that the condition related to pluralism of objects should apply if it is presumed that the obstacle includes a plurality of objects, that is, the obstacle is not a single, and the restriction release determiner 44 prohibits the release of the driving restriction control. The information of prohibiting the release of the driving restriction control is sent as a signal to the driving controller 51 in the vehicle control device 5.

There are multiple methods for assuming that the obstacle includes a plurality of objects, and any method may be used. For example, the obstacle determiner 42 in the present embodiment may determine that two vehicles at different distances are detected, when a plurality of pieces of distance information are detected and the difference between the pieces of distance information exceeds a predetermined value, for example, 30 cm. The distance information detected is information indicating the distance calculated by the distance calculator 41, based on an electrical signal based on the ultrasonic wave received by the receiver included in the first detector 21 or the second detector 22, as described in the first embodiment.

The predetermined condition for prohibiting the release of the driving restriction control in the present embodiment is the condition related to pluralism of distance information to the detected obstacle, as described above. More precisely, for example, when there are a plurality of pieces of distance information and the difference between the pieces of distance information exceeds a threshold value, the restriction release determiner 44 in the present embodiment determines that the condition related to pluralism of objects should apply and prohibits the release of the driving restriction control. In other words, the restriction release determiner 44 in the present embodiment causes the driving controller 51 to prohibit the release of the driving restriction control when the restriction release determiner 44 determines release prohibition to prohibit the release of the driving restriction control of the moving object under a predetermined condition. The threshold value for the difference between the pieces of distance information is 30 cm in the present embodiment but is not limited to this value.

For example, in FIG. 20, the first detector 21 disposed to the right of the center of the front of the vehicle 100 detects a propagation distance A1 of the ultrasonic wave passing through the spoke of the wheel of the two-wheel vehicle 31*b* and reflected by the four-wheel vehicle 31*a*. In comparison, the second detector 22 disposed to the left of the center of the front of the vehicle 100 detects a propagation distance A2 of the ultrasonic wave reflected by the main part of the two-wheel vehicle 31*b*, especially the engine part. Thus, there is a difference in distance information detected. In general, a side surface of one vehicle seldom has a large protrusion or depression exceeding 30 cm, and when the two-wheel vehicle 31*b* runs alongside the four-wheel vehicle 31*a*, the two-wheel vehicle 31*b* does not approach within 30 cm as long as it keeps a safe distance on the side. Based on these, when there are a plurality of pieces of distance information and the difference between the pieces of distance information exceeds 30 cm, it can be assumed that there are two vehicles. Although an example in which there is a difference between distance information detected by two detectors, namely, the first detector 21 and the second detector 22 has been described above, the present embodiment can be applied also when there are a plurality of pieces of distance information detected by one detector and there is a difference between the pieces of distance information. For example, the second detector 22 to the left of the center of the front of the vehicle 100 or the first detector 21 to the right of the center of the front of the vehicle 100 may receive the ultrasonic wave reflected by the two-wheel vehicle 31*b* and thereafter receive the ultrasonic wave reflected by the four-wheel vehicle 31*a* after a time difference in accordance with the propagation distance. Since the first detector 21 or the second detector 22 can individually detect reflected waves received at different timings, a plurality of pieces of distance information corresponding to the individual reflected waves can be obtained. In this way, the obstacle determiner 42 in the present embodiment may assume that there are two vehicles also when there are a plurality of pieces of distance information detected by one obstacle detection device and the difference between the pieces of distance information exceeds 30 cm.

Furthermore, the restriction release determiner 44 may prohibit the release of the driving restriction control when the distribution of strength (amplitude) information of the received wave signal detected by the second detector 22 has a plurality of peaks. When there are a plurality of obstacles reflecting ultrasonic waves, for example, when the ultrasonic wave reflected by the two-wheel vehicle 31*b* is received and thereafter the ultrasonic wave reflected by the four-wheel vehicle 31*a* is received, the distribution of strength (amplitude) information of the received wave signal, that is, the distribution of the received wave signal strength on the time axis, has peaks at positions (times) corresponding to the respective distances to a plurality of obstacles. When there are two peaks, therefore, the obstacle determiner 42 in the present embodiment may determine that there are two obstacles at different distances. Since the strength of the reflected wave from the two-wheel vehicle 31*b* tends to be lower, pluralism of obstacles may be assumed if there is a second peak at a position different from the reflected wave from the four-wheel vehicle 31*a*, even though its strength does not reach a threshold value for detecting an obstacle. If the difference in distance corresponding to the difference in position between the two peaks exceeds 30 cm, the possibility that the waves are reflected at different positions on a side surface of one vehicle can be excluded. Therefore, if the strength distribution has two peaks and the difference in distance corresponding to the difference in position between the peaks exceeds 30 cm, the obstacle determiner 42 in the present embodiment can assume that there are two vehicles in view of pluralism of distance information.

Furthermore, pluralism of obstacles may be assumed when the difference in strength between received wave signals detected by one detector or a plurality of detectors is equal to or greater than a predetermined threshold value. The two-wheel vehicle 31*b* is a bicycle and has no engine part, a part of the ultrasonic wave emitted by the second detector 22 is partially interrupted by the bicycle rider's leg, and the rest of the ultrasonic wave is reflected by the four-wheel vehicle 31*a*, and a part of the reflected ultrasonic wave is interrupted by the bicycle rider's leg again and the rest is received by the second detector 22. In this way, when the bicycle rider's leg is on the path of the ultrasonic wave moving back and forth, the strength of the received wave signal is weakened as much as the ultrasonic wave is interrupted by the rider's leg. Since the human body, especially the human body covered by clothing, has low reflectivity of ultrasonic waves, the ultrasonic wave reflected by the human body may have no detectable peak in the distribution of strength information of the received wave signal and may fail to be detected as an obstacle. However, if there is a difference equal to or greater than a predetermined threshold value between the strengths of the reflected waves of the four-wheel vehicle 31*a* received by different detectors, for example, the first detector 21, and the strength of the reflected wave of the four-wheel vehicle 31*a* received by the second detector 22, it is conceivable that another vehicle be in front of the four-wheel vehicle 31*a* and is blocking the reflected wave. Thus, pluralism of obstacles may be assumed if there is a difference equal to or greater than a predetermined threshold value between the strengths of the reflected waves. In other words, the predetermined condition for prohibiting the release of the driving restriction control in the present embodiment may be a condition related to the strength information of the detected received wave signal. In this case, the restriction release determiner 44 in the present embodiment prohibits the release of the driving restriction control due to pluralism of obstacles when the difference between strength information of the received wave signals exceeds a threshold value.

(Modification)

The foregoing tenth embodiment handles a case where the four-wheel vehicle 31a and the two-wheel vehicle 31b are in front of the vehicle 100. However, the present modification handles a case where initially only the four-wheel vehicle 31a is present in front of the vehicle 100, and later the two-wheel vehicle 31b comes in. The configuration of the object detection device 1 according to the present modification is similar to that of the object detection device 1c illustrated by the block diagram in FIG. 9 used to describe the fourth embodiment and thus a description of each component will be omitted. The object detection device 1 according to the present modification differs from the object detection device 1c according to the fourth embodiment in the condition by which the restriction release determiner 44c prohibits the release of the driving restriction control.

Figure 21:
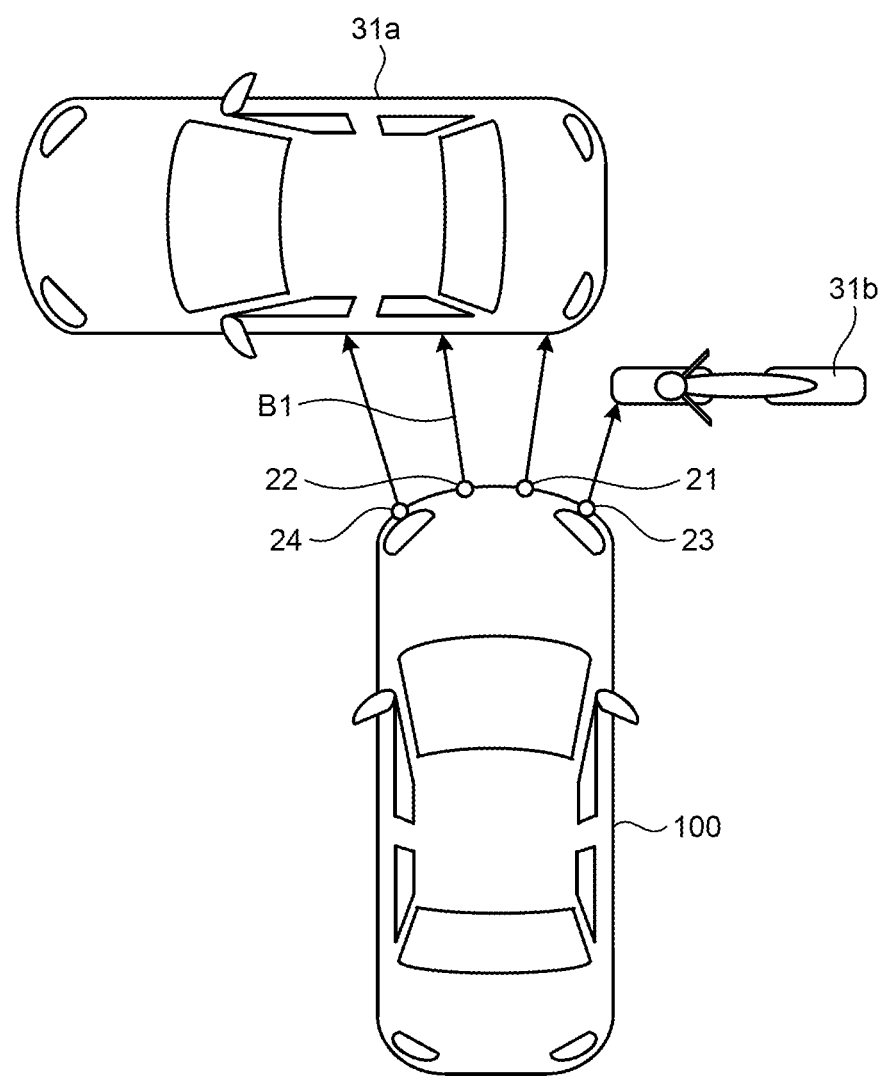
FIG. 21 is a diagram illustrating an object detection state when other vehicles include a two-wheel vehicle according to a modification.

The present modification will be described using FIG. 21 which is a diagram illustrating the positional relation of the vehicles. FIG. 21 is a diagram illustrating an object detection state when other vehicles include a two-wheel vehicle according to the modification. The fourth embodiment handles a case where a vehicle (two-wheel vehicle 31b) is behind a vehicle (four-wheel vehicle 31a) crossing in front of the vehicle 100, whereas the present modification handles a case where the two-wheel vehicle 31b behind on the right side catches up with the vehicle (four-wheel vehicle 31a) crossing in front and runs alongside at the position illustrated in FIG. 20.

When the two-wheel vehicle 31b is in front of the first detector 21 to the fourth detector 24, the two-wheel vehicle 31b is sometimes partially not detected as an obstacle because the ultrasonic wave passes through the spoke of the wheel, as described above. However, it is not completely undetected but is partially detectable as an obstacle by the obstacle determiner 42 because the main part of the body of the two-wheel vehicle 31b, especially the engine part, reflects ultrasonic waves. The first detector 21 to the fourth detector 24 repeat detection at a frequency of more than 10 times per second. The obstacle detector 42 therefore can detect the two-wheel vehicle 31b as an obstacle based on the detection results of the first detector 21 to the fourth detector 24, at any point in a period until the two-wheel vehicle 31b behind on the right side passes through the position illustrated in FIG. 21 and reaches the position alongside the vehicle (four-wheel vehicle 31a) crossing in front, as illustrated in FIG. 20. For example, when the third detector 23 detects the two-wheel vehicle 31b as an obstacle in FIG. 21, the third detector 23 changes from a state in which an object is not detected when only the four-wheel vehicle 31a is present in front to a state in which an obstacle is detected, and it can be determined that a second obstacle is added to the original obstacle, that is, there are a plurality of obstacles.

Since the two-wheel vehicle 31b does not reflect ultrasonic waves at some parts, the two-wheel vehicle 31b may be detected as an obstacle when it stops in front of the vehicle 100 and comes into the positional relation in FIG. 20, but the two-wheel vehicle 31b may not be detected in some cases. In other words, when the crossing determiner 43 determines that crossing has occurred, the two-wheel vehicle 31b is not always detected as a second obstacle different from the obstacle that has been detected in the moving direction of the moving object. When the two-wheel vehicle 31b is detected as an obstacle in the process before the positional relation between the four-wheel vehicle 31a and the two-wheel vehicle 31b becomes the positional relation illustrated in FIG. 20, the object detection device 1 stores the occurrence of an event indicating the possibility that a second obstacle different from the four-wheel vehicle 31a is added in front, until the time point when crossing is determined, so that the object detection device 1 can determine that there is a possibility of a collision with a second obstacle added in front and can prohibit the release of the driving restriction control. The existence of an event indicating the possibility that an obstacle other than the four-wheel vehicle 31a is added is stored, for example, in a not-illustrated memory in the object detection device 1.

Specifically, even when the crossing determiner 43 determines crossing of a second vehicle (when from a state in which both of the first detector 21c and the second detector 22c detect the obstacle, a state in which it is undetected by the obstacle sensor 2c of either of the first detector 21c or the second detector 22c is reached), the restriction release determiner 44 prohibits the release of the driving restriction control if there is a possibility that a second obstacle is added in front and it is presumed that there are a plurality of obstacles. The information of prohibiting the release of the driving restriction control is sent as a signal to the driving controller 51 in the vehicle control device 5. In other words, when an event of detecting a second obstacle different from the obstacle that has been detected in the moving direction of the moving object occurs before the crossing determiner 43 determines that crossing has occurred, the restriction release determiner 44 prohibits the release of the driving restriction control based on the condition of pluralism of obstacles.

The addition of a second obstacle can be detected not only when a state in which an object is not detected changes to a state in which an object is detected, but also in other cases. For example, when the two-wheel vehicle 31b moves forward from the position in FIG. 21, a state in which the ultrasonic wave emitted by the first detector is reflected only by the four-wheel vehicle 31a changes to a state in which it is reflected by both of the four-wheel vehicle 31a and the two-wheel vehicle 31b, and the strength distribution of the received wave signal may have a plurality of peaks. In this case, if the peak indicating the sound wave reflected by the two-wheel vehicle 31b exceeds a threshold value for detecting an obstacle, it can be determined that an event of detecting a second obstacle different from the obstacle that has been detected in the moving direction of the moving object has occurred. However, as described above, the strength of the reflected wave from the two-wheel vehicle 31b (including the rider) is sometimes weak. Therefore, even when the peak does not exceed the threshold value for detecting an obstacle, the event in which the strength distribution of the received wave signal has a plurality of peaks can be determined as the condition related to pluralism of objects. Furthermore, as described above, the strength of the reflected wave from the four-wheel vehicle 31a may be weakened by the two-wheel vehicle 31b interrupting in front of the four-wheel vehicle 31a. Therefore, when the strength distribution of the received wave signal changes beyond the threshold value, blocking by another object may be assumed and it may be determined that the condition related to pluralism of objects should apply. In this case, a predetermined condition used to determine the prohibition of release is a condition related to change in strength distribution of the detected received wave signal, and when an event of the number of peaks appearing in the strength distribution of the received wave signal increasing occurs before the crossing determiner 43 determines that crossing has occurred, the restriction release determiner 44 prohibits the release of the driving restriction control.

Alternatively, the predetermined condition used to determine the prohibition of release may be a condition related to change in strength information of the detected received wave signal. In this case, when an event of the strength information of the received wave signal changing beyond a threshold value occurs before the crossing determiner 43 determines that crossing has occurred, the restriction release determiner 44 prohibits the release of the driving restriction control.

The possibility that a second obstacle is added in front may be determined by change in the detected distance. When the positional relation between the four-wheel vehicle 31a and the two-wheel vehicle 31b changes from the positional relation in FIG. 21 to the positional relation in FIG. 20, the distance detected by the second detector 22 to the left of the center of the front of the vehicle 100 changes from distance B1 to distance A2 due to intrusion of the two-wheel vehicle 31b in front of the four-wheel vehicle 31a. As long as a safe distance on the side is kept, the difference between the distance to a side surface of the four-wheel vehicle 31a and the distance to a side surface of the two-wheel vehicle 31b is not less than 30 cm. If the detected distance decreases to less than 30 cm, the obstacle determiner 42 in the present modification detects this decrease as an event indicating the possibility that a second obstacle is added in front, and stores the occurrence of this event until the time point when crossing is determined, so that it can be determined that the condition related to pluralism of objects should apply, and the release of the driving restriction control can be prohibited.

As described above, change in strength distribution of the received wave signal, change in strength information of the received wave signal, or change in the detected distance is a condition by which change in number of obstacles can be detected. In other words, the predetermined condition is a condition related to change in number of detected obstacles. More specifically, when an event of detecting a second obstacle different from the obstacle that has been detected in the moving direction of the moving object occurs before the crossing determiner 43 determines that crossing has occurred, the restriction release determiner 44 prohibits the release of the driving restriction control.

The object detection device 1 according to the present embodiment determines that the condition related to pluralism of objects should apply and prohibits the release of the driving restriction control when the obstacle in front of the vehicle 100 includes a plurality of vehicles, such as the four-wheel vehicle 31a and the two-wheel vehicle 31b, and the four-wheel vehicle 31a crosses and the two-wheel vehicle 31b remains in front, thereby reducing the possibility that the vehicle 100 hits against the two-wheel vehicle 31b in such a state.

The first to tenth embodiments of the object detection device of the present disclosure have been described above, and each embodiment can be implemented in combination with another embodiment as appropriate. In the foregoing embodiments, the object detection device is mounted on the vehicle 100. However, the object detection device may be mounted on a moving object such as an airplane or a ship, rather than the vehicle 100. The obstacles are not limited to other vehicles and may be bicycles or motorcycles, and the object detection device in the present disclosure can determine their crossing.

In the foregoing embodiments, ultrasonic waves are used as search waves transmitted by the obstacle sensor, but search waves other than ultrasonic waves, such as sound waves or radio waves, may also be used.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

EXPLANATIONS OF LETTERS OR NUMERALS 1, 1a, 1b, 1c, 1d, 1e, 1f, 1g, 1h object detection device
2, 2a, 2b, 2c, 2d, 2e, 2f, 2g, 2h obstacle sensor
21, 21a, 21b, 21c, 21d, 21e, 21f, 21g, 21h first detector
22, 22a, 22b, 22c, 22d, 22e, 22f, 22g, 22h second detector
23, 23c third detector
24, 24c fourth detector
3 obstacle
3a first obstacle
3b second obstacle
31a four-wheel vehicle
31b two-wheel vehicle
4a, 4b, 4c, 4d, 4e, 4f sonar control unit
41, 41a, 41b, 41c, 41d, 41e, 41f, 41g, 41h distance calculator
42, 42a, 42b, 42c, 42d, 42e, 42f, 42g, 42h obstacle determiner
43, 43a, 43b, 43c, 43d, 43e, 43f, 43h crossing determiner
44, 44a, 44b, 44c, 44d, 44e, 44f, 44g, 44h restriction release determiner
45g, 45h coordinate tracker
46g, 46h collision prediction determiner
5 vehicle control device
51 driving controller
6 operating unit
61 accelerator pedal
62 brake pedal
63 notification unit

What is claimed is:

1. An object detection device mounted on a moving object to detect an object present around the moving object, the object detection device comprising:
a first detector configured to detect an object by transmitting, at different points, ultrasonic waves in a moving direction of the moving object, and receiving a-reflected waves of each of the ultrasonic; waves;
a second detector configured to detect an object by transmitting, at different points, ultrasonic waves in the moving direction of the moving object from a position different from the first detector, and receiving reflected waves of each of the ultrasonic waves;
a memory; and
a hardware processor coupled to the memory,
the hardware processor being configured to:
determine that an obstacle is present in the moving direction of the moving object, based on an object detection result by the first detector and an object detection result by the second detector;
determine crossing of the obstacle based on an object detection result by the first detector and an object detection result by the second detector in a state in which the hardware processor is determining that the obstacle is present; and cause a driving controller mounted on the moving object, to release driving restriction control of restricting movement of the moving object in case the hardware processor determines the crossing, or prohibit the driving controller from releasing the driving restriction control under a predetermined condition, wherein in case the predetermined condition is a condition related to variance of distance information detected by the second detector, the distance information including a plurality of distances from the moving object to different points on the obstacle, the hardware processor is configured to prohibit the driving controller from releasing the driving restriction control in case the variance of the distance information is equal to or less than a threshold value.

2. The object detection device according to claim 1, wherein the hardware processor is configured to cause the driving controller to release the driving restriction control when the moving object is stopped.

3. The object detection device according to claim 1, wherein the hardware processor is configured to determine that the crossing of the obstacle has occurred, when in a state in which the hardware processor is determining that the obstacle is present, from a state in which an object is detected by the first detector and an object is undetected by the second detector, a state in which an object is detected in the first detector and the second detector is reached.

4. The object detection device according to claim 1, wherein the hardware processor is configured to:
determine a possibility of a collision between the moving object and the obstacle, based on expected trajectory information of the obstacle calculated based on an object detection result by the first detector and an object detection result by the second detector in a state in which the hardware processor is determining that the obstacle is present, and
cause the driving controller to adjust a control amount of driving restriction control of restricting movement of the moving object when the hardware processor determines that the possibility of the collision between the moving object and the obstacle is low.

5. The object detection device according to claim 1, wherein the driving restriction control is to restrict movement of the moving object by acceleration suppression or braking control.

6. The object detection device according to claim 1, wherein in case the predetermined condition is a condition related to pluralism of objects, the hardware processor is configured to prohibit release of the driving restriction control based on the pluralism of objects.

7. The object detection device according to claim 1, wherein in case the predetermined condition is a condition related to pluralism of distance information to the obstacle, the hardware processor is configured to prohibit release of the driving restriction control when the distance information includes a plurality of pieces of distance information and a difference between the plurality of pieces of distance information exceeds another threshold value.

8. The object detection device according to claim 1, wherein in case the predetermined condition is a condition related to variance of strength information of a received wave signal detected by the second detector, the hardware processor is configured to prohibit release of the driving restriction control, when the variance of strength information of a received wave signal is equal to or less than another threshold value.

9. The object detection device according to claim 1, wherein in case the predetermined condition is a condition related to variance of strength information of a received wave signal detected, the hardware processor is configured to prohibit release of the driving restriction control, when a difference of the strength information of the received wave signal exceeds another threshold value.

10. The object detection device according to claim 1, wherein in case the predetermined condition is a condition related to change in strength distribution of a received wave signal detected, the hardware processor is configured to prohibit release of the driving restriction control, when an event of a number of peaks appearing in the strength distribution of the received wave signal increasing has occurred before the hardware processor determines that the crossing has occurred.

11. The object detection device according to claim 1, wherein in case the predetermined condition is a condition related to change in a number of obstacles detected, the hardware processor is configured to prohibit release of the driving restriction control, when an event of detecting a second obstacle different from the obstacle that has been detected in the moving direction of the moving object has occurred before the hardware processor determines that the crossing has occurred.

12. The object detection device according to claim 1, wherein in case the predetermined condition is a condition related to a time elapsed after the moving object stops, the hardware processor is configured to prohibit release of the driving restriction control, when the time elapsed after the moving object stops does not reach a predetermined time.

13. A driving assistance system comprising:
a first detector configured to detect an object by transmitting, at different points, ultrasonic waves in a moving direction of a moving object, and receiving reflected waves of each of the ultrasonic waves;
a second detector configured to detect an object by transmitting, at different points, ultrasonic waves in the moving direction of the moving object from a position different from the first detector, and receiving a reflected waves of each of the ultrasonic waves;
a memory; and
a hardware processor coupled to the memory,
the hardware processor being configured to:
control movement of the moving object;
determine that an obstacle is present in the moving direction of the moving object, based on an object detection result by the first detector and an object detection result by the second detector;
determine that crossing of the obstacle has occurred, based on an object detection result by the first detector and an object detection result by the second detector in a state in which the hardware processor is determining that the obstacle is present; and
release driving restriction control of restricting movement of the moving object in case the hardware processor determines the crossing, or prohibit release of the driving restriction control under a predetermined condition, wherein in case the predetermined condition is a condition related to variance of distance information detected by the second detector, the distance information including a plurality of distances from the moving object to different points on the obstacle, the hardware processor is configured to prohibit release of the driving restriction control in case the variance of the distance information is equal to or less than a threshold value.

14. An object detection device mounted on a moving object to detect an object present around the moving object, the object detection device comprising:
- a first detector configured to detect an object by transmitting an ultrasonic wave in a moving direction of the moving object and receiving a reflected wave of the ultrasonic wave;
- a second detector configured to detect an object by transmitting an ultrasonic wave in the moving direction of the moving object from a position different from the first detector and receiving a reflected wave of each of the ultrasonic wave;
- a memory; and
- a hardware processor coupled to the memory, the hardware processor being configured to:
  - determine that an obstacle is present in the moving direction of the moving object, based on an object detection result by the first detector and an object detection result by the second detector;
  - determine crossing of the obstacle based on an object detection result by the first detector and an object detection result by the second detector in a state in which the hardware processor is determining that the obstacle is present; and
  - cause a driving controller mounted on the moving object, to release driving restriction control of restricting movement of the moving object when the hardware processor determines the crossing, or prohibit the driving controller from releasing the driving restriction control under a predetermined condition, wherein the predetermined condition is a condition related to change in strength distribution of a received wave signal detected, and the hardware processor is configured to prohibit release of the driving restriction control, when an event of a number of peaks appearing in the strength distribution of the received wave signal increasing has occurred before the hardware processor determines that the crossing has occurred.

* * * * *